(12) United States Patent
Wang et al.

(10) Patent No.: US 12,527,763 B2
(45) Date of Patent: Jan. 20, 2026

(54) PYRROLE AMIDE COMPOUND AND USE THEREOF

(71) Applicant: SUNSHINE LAKE PHARMA CO., LTD., Guangdong (CN)

(72) Inventors: Jiancheng Wang, Dongguan (CN); Xiaojun Wang, Dongguan (CN); Yinglin Zuo, Dongguan (CN); Yingxun Zhang, Dongguan (CN); Yingjun Zhang, Dongguan (CN); Bo Chi, Dongguan (CN); Wei Han, Dongguan (CN); Xiaohong Ding, Dongguan (CN); Junnan Zeng, Guangdong (CN)

(73) Assignee: SUNSHINE LAKE PHARMA CO., LTD., Guangdong (CN)

( * ) Notice: Subject to any disclaimer, the term of this patent is extended or adjusted under 35 U.S.C. 154(b) by 972 days.

(21) Appl. No.: 17/605,934

(22) PCT Filed: Oct. 21, 2020

(86) PCT No.: PCT/CN2020/122388
§ 371 (c)(1),
(2) Date: Oct. 22, 2021

(87) PCT Pub. No.: WO2021/078135
PCT Pub. Date: Apr. 29, 2021

(65) Prior Publication Data
US 2022/0211665 A1    Jul. 7, 2022

(30) Foreign Application Priority Data
Oct. 25, 2019  (CN) .......................... 201911021710.1

(51) Int. Cl.
| | |
|---|---|
| *A61K 31/40* | (2006.01) |
| *A61K 31/4025* | (2006.01) |
| *A61K 31/428* | (2006.01) |
| *A61K 31/4439* | (2006.01) |
| *A61K 31/616* | (2006.01) |
| *A61K 45/06* | (2006.01) |
| *C07D 207/34* | (2006.01) |
| *C07D 401/04* | (2006.01) |
| *C07D 405/04* | (2006.01) |
| *C07D 405/06* | (2006.01) |
| *C07D 417/12* | (2006.01) |

(52) U.S. Cl.
CPC .......... *A61K 31/40* (2013.01); *A61K 31/4025* (2013.01); *A61K 31/428* (2013.01); *A61K 31/4439* (2013.01); *A61K 31/616* (2013.01); *A61K 45/06* (2013.01); *C07D 207/34* (2013.01); *C07D 401/04* (2013.01); *C07D 405/04* (2013.01); *C07D 405/06* (2013.01); *C07D 417/12* (2013.01)

(58) Field of Classification Search
CPC ................ A61K 2300/00; A61K 31/40; A61K 31/4025; A61K 31/428; A61K 31/4439; A61K 31/616; A61K 45/06; A61K 31/427; A61P 1/16; A61P 13/12; A61P 25/00; A61P 25/04; A61P 25/16; A61P 25/22; A61P 25/24; A61P 25/28; A61P 3/04; A61P 3/10; A61P 31/04; A61P 31/10; A61P 31/12; A61P 7/02; A61P 7/10; A61P 9/04; A61P 9/10; A61P 9/12
See application file for complete search history.

(56) References Cited

U.S. PATENT DOCUMENTS

| | | |
|---|---|---|
| 8,367,667 B2 | 2/2013 | Canne Bannen et al. |
| 8,487,117 B2 | 7/2013 | Nuss et al. |
| 8,642,640 B2 | 2/2014 | Nuss et al. |
| 8,754,118 B2 | 6/2014 | Aoki et al. |
| 2011/0144128 A1 | 6/2011 | Flatt et al. |
| 2014/0024696 A1* | 1/2014 | Aoki ....................... A61P 13/12 514/423 |

FOREIGN PATENT DOCUMENTS

| | | | | |
|---|---|---|---|---|
| CN | 110483401 A | * | 11/2019 | ................ A61P 9/00 |
| WO | 2007/024744 A2 | | 3/2007 | |

OTHER PUBLICATIONS

Barbachyn et al (Bioorganic & Medicinal Chemistry Letters, vol. 6, No. 9, pp. 1009-1014, 1996) (Year: 1996).*
Shah et al (Journal of Enzyme Inhibition and Medicinal Chemistry, Oct. 2007; 22(5): 527-540). (Year: 2007).*
Kirk et al (Am Fam Physician. 1999;59(11):3140-3148) (Year: 1999).*
Jan. 20, 2021 International Search Report issued in International Patent Application No. PCT/CN2020/122388.
Jan. 20, 2021 Written Opinion of the International Searching Authority issued in International Patent Application No. PCT/CN2020/122388.

* cited by examiner

*Primary Examiner* — Jean P Cornet
(74) *Attorney, Agent, or Firm* — Oliff PLC

(57) ABSTRACT

A pyrrole amide compound, a pharmaceutical composition thereof and use thereof. The compound or the pharmaceutical composition can be used as a mineralocorticoid receptor antagonist.

9 Claims, No Drawings

PYRROLE AMIDE COMPOUND AND USE THEREOF

CROSS-REFERENCE TO RELATED APPLICATIONS

This is a U.S. national stage application of the International Patent Application No. PCT/CN2020/122388, filed Oct. 21, 2020, which claims priority to Chinese Patent Application No. 201911021710.1, filed Oct. 25, 2019, both of which are incorporated herein by reference in their entirety.

FIELD

The present invention belongs to the field of pharmaceuticals, and specifically relates to a pyrrole amide compound and the use thereof. It further relates to a pharmaceutical composition comprising the compound. The compound or the pharmaceutical composition can be used as a mineralocorticoid receptor antagonist.

BACKGROUND

Mineralocorticoid Receptor (MR) is a nuclear hormone receptor activated by aldosterone, which regulates the expression of many genes involved in electrolyte homeostasis and cardiovascular diseases. The increase in circulating aldosterone increases blood pressure through its effect on urinary sodium excretion, and potentially affects the brain, heart, and vascular system at the same time. In addition, hyperaldosteronism is related to many physiological processes that lead to kidney and cardiovascular diseases. Although hyperaldosteronism is usually caused by aldosterone-producing adenomas, patients with refractory hypertension often have elevated aldosterone levels, commonly referred to as "aldosterone escape", which is due to increased serum potassium levels or residual AT1R activity. Hyperaldosteronism and aldosterone escape typically lead to increased MR activity. It has been proven that MR antagonists can be effective antihypertensive agents and can also be effective in the treatment of heart failure and primary aldosteronism.

Aldosterone is a steroid hormone formed in the adrenal cortex. Its production greatly depends on renal blood flow and is indirectly regulated. Any reduction in renal blood flow causes the enzyme renin in the kidney to be released and enter the circulating blood. This in turn activates the formation of angiotensin II, which on the one hand has a constrictive effect on arterial blood vessels, but on the other hand also stimulates the formation of aldosterone in the adrenal cortex. Thus, the kidney is used as a blood pressure sensor in the blood circulation, and thus indirectly as a volume sensor, and the serious loss of volume is offset by the renin-angiotensin-aldosterone system. This is achieved on the one hand by increasing blood pressure (angiotensin II effect), on the other hand by increasing the reabsorption of sodium and water in the kidney to rebalance the filling state of the vascular system (aldosterone effect).

The control system can be damaged in various ways. For example, a chronic decrease in renal blood flow (eg, due to heart failure and the resulting blood blockage in the venous system) results in chronic excess release of aldosterone. This is followed by the expansion of blood volume and thereby increasing the weakness of the heart by increasing the supply of blood volume to the heart. The obstruction of blood in the lungs, along with shortness of breath and the formation of edema of the limbs, and ascites and pleural effusion may result from this; renal blood flow decreases further. In addition, excessive aldosterone leads to a decrease in the potassium concentration in the blood and extracellular fluid. In myocardium that has been damaged in other ways before, if there is a deviation below the critical minimum level, it may induce fatal cardiac arrhythmia. This is likely to be one of the main causes of sudden cardiac death that often occurs in patients with heart failure.

In addition, it has also been reported that aldosterone determines many of the myocardial remodeling processes that are typically observed in heart failure. Thus, hyperaldosteronism is a decisive component of the pathogenesis and prognosis of heart failure, which can be initially induced by various types of injury, such as myocardial infarction, myocardial inflammation, or hypertension. This hypothesis is supported by the fact that in an extensive clinical study of patients with chronic heart failure and post-acute myocardial infarction through the use of aldosterone antagonists, overall mortality was significantly reduced (B. Pitt, F. Zannad, W J Remme et al., *N. Engl. J. Med. ML* 709-717 (1999); B. Pitt, W. Remme, F. Zannad et al., *N. Engl. J. Med* 1309-1321 (2003)).

In addition, in visceral tissues, such as kidneys and intestines, MR regulates sodium retention, potassium excretion, and water balance in response to aldosterone. The expression of MR in the brain also seems to play a role in controlling neuronal excitability, negative feedback regulation of the hypothalamic-pituitary adrenal axis, and cognitive aspects of behavioral performance (Castren et al., *J. of Neuroendocrinology,* 3, 461-66 (1993)).

Increased levels of aldosterone or excessive stimulation of mineralocorticoid receptors are related to some physiological disorders or pathological conditions, including Conen's syndrome, primary and secondary hyperaldosteronism, and increased sodium retention, increased excretion of magnesium and potassium (polyuria), increased water retention, hypertension (isolated systolic hypertension and combined systolic/diastolic hypertension), arrhythmia, myocardial fibrosis, myocardial infarction, Bart's syndrome, and disorders related to excessive catecholamine levels (Hadley, M E, ENDOCRINOLOGY, 2nd Ed., pp 366-81, (1988); and Brilla et al., *Journal of Molecular and Cellular Cardiology,* 25(5), pp 563-75 (1993)). Compounds and/or pharmaceutical compositions with MR antagonism have therapeutic value for any of the above-mentioned conditions.

International application WO 2006012642 A2 discloses a pyrrole derivative—a racemate of Esaxerenone (CS-3150, whose chemical structure is shown below), which is used to modulate the activity of one or more steroid nuclear receptors. Patent application WO 2008126831 A1 discloses Esaxerenone with a stereo-configuration, which can be used to treat diseases such as hypertension. According to the "Examination Report" (Jan. 8, 2019) published by PMDA, Japan's Pharmaceuticals and Medical Devices Agency, the compound has phototoxicity. For example, in vitro Balb/c 3T3 fibroblast neutral red uptake test results show the compound is phototoxic (light stimulus factor PIF>17).

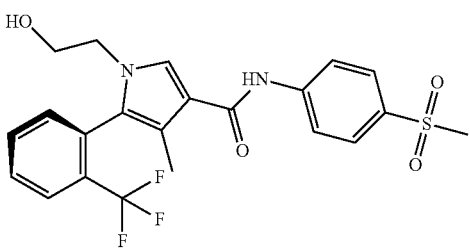

Although mineralocorticoid receptor antagonists have made significant progress in the treatment of hypertension and heart failure, the current standard of care is only close to the best, and there are still obvious unmet medical needs for other treatments/pharmacological interventions. The present invention addresses those needs by providing compounds and compositions that can be used to treat or prevent hypertension, heart failure, other cardiovascular disorders, and other aldosterone disorders.

SUMMARY OF THE INVENTION

The present invention provides a pyrrole amide compound with mineralocorticoid receptor (MR) antagonism and a pharmaceutical composition thereof, as well as the use of the compound or the pharmaceutical composition in the manufacture of a medicament for treating, preventing or alleviating hyperaldosteronism, hypertension, chronic heart failure, sequelae of myocardial infarction, liver cirrhosis, non-alcoholic steatohepatitis, chronic kidney disease, diabetic nephropathy, renal failure, fibrosis and/or stroke, and the like in patients.

In one aspect, provided herein is a compound having Formula (I) or a stereoisomer, a geometric isomer, a tautomer, an atropisomer, an N-oxide, a hydrate, a solvate, a metabolite, an ester, a pharmaceutically acceptable salt or a prodrug thereof,

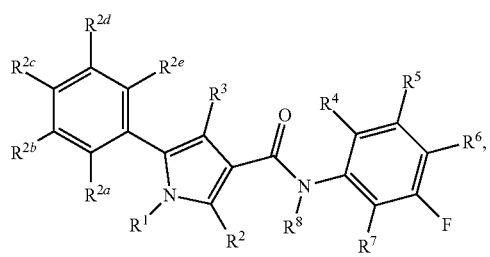

(I)

wherein, $R^1$ is $C_{1-6}$ alkyl, $C_{3-6}$ cycloalkyl, $C_{6-10}$ aryl, 3-6 membered heterocyclyl or 5-10 membered heteroaryl, wherein, the $C_{1-6}$ alkyl, $C_{3-6}$ cycloalkyl, $C_{6-10}$ aryl, 3-6 membered heterocyclyl and 5-10 membered heteroaryl are independently and optionally substituted with 1, 2, 3 or 4 $R^a$;

each $R^a$ is independently D, F, Cl, Br, OH, $NH_2$, SH, CN, $NO_2$, $C_{1-6}$ alkyl, $C_{2-6}$ alkenyl, $C_{2-6}$ alkynyl, $C_{1-6}$ alkoxy, $C_{1-6}$ haloalkyl, $C_{3-6}$ cycloalkyl, $C_{6-10}$ aryl, 3-6 membered heterocyclyl or 5-10 membered heteroaryl; wherein, the $C_{1-6}$ alkyl, $C_{2-6}$ alkenyl, $C_{2-6}$ alkynyl, $C_{1-6}$ alkoxy, $C_{1-6}$ haloalkyl, $C_{3-6}$ cycloalkyl, $C_{6-10}$ aryl, 3-6 membered heterocyclyl and 5-10 membered heteroaryl are independently unsubstituted or substituted with 1, 2, 3 or 4 substituents selected from D, F, Cl, Br, OH, $NH_2$, SH, CN, $NO_2$, $C_{1-6}$ alkyl, $C_2$-6 alkenyl, $C_{2-6}$ alkynyl, $C_{1-6}$ alkoxy and $C_{1-6}$ haloalkyl;

each of $R^{2a}$, $R^{2b}$, $R^{2c}$, $R^{2d}$ and $R^{2e}$ is independently H, D, F, Cl, Br, OH, $NH_2$, SH, CN, $NO_2$, —C(=O)$C_{1-6}$ alkyl, —C(=O)O$C_{1-6}$ alkyl, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy, $C_{1-6}$ alkylamino, $C_{3-6}$ cycloalkyl, $C_{6-10}$ aryl, 3-6 membered heterocyclyl or 5-10 membered heteroaryl;

each of $R^2$ and $R^3$ is independently H, D, F, Cl, Br, OH, $NH_2$, SH, CN, $NO_2$, $C_{1-6}$ alkyl, $C_{2-6}$ alkenyl, $C_{2-6}$ alkynyl or $C_{1-6}$ haloalkyl;

each of $R^4$, $R^5$, $R^6$ and $R^7$ is independently H, D, F, Cl, Br, OH, $NH_2$, SH, CN, $NO_2$, —C(=O)$C_{1-6}$ alkyl, —C(=O)O$C_{1-6}$ alkyl, —S—$C_{1-6}$ alkyl, —S(=O)$C_{1-6}$ alkyl, —S(=O)$_2C_{1-6}$ alkyl, —S(=O)$_2NR^bR^c$, —S(=O)$_2OC_{1-6}$ alkyl, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy, $C_{1-6}$ alkylamino, $C_{3-6}$ cycloalkyl, $C_{6-10}$ aryl, 3-6 membered heterocyclyl or 5-10 membered heteroaryl; or $R^5$ and $R^6$ together with the carbon atom to which they are attached, form a $C_{3-6}$ carbocyclic ring, a $C_{6-10}$ aromatic ring, a 3-6 membered heterocyclic ring or a 5-10 membered heteroaromatic ring, wherein each of the $C_{3-6}$ carbocyclic ring, $C_{6-10}$ aromatic ring, 3-6 membered heterocyclic ring and the 5-10 membered heteroaromatic ring is independently unsubstituted or substituted with 1, 2, 3, 4 or 5 substituents independently selected from =O, D, F, Cl, Br, OH, $NH_2$, SH, CN, $NO_2$, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy and $C_{1-6}$ alkylamino;

each of $R^8$, $R^b$ and R is independently H, D, $C_{1-6}$ alkyl or $C_{1-6}$ haloalkyl.

In some embodiments, each of $R^2$ and $R^3$ is independently H, D, F, Cl, Br, OH, $NH_2$, SH, CN, $NO_2$, methyl, ethyl, n-propyl, isopropyl, trifluoromethyl or difluoromethyl;

each of $R^4$, $R^5$, $R^6$ and $R^7$ is independently H, D, F, Cl, Br, OH, $NH_2$, SH, CN, $NO_2$, —C(=O)$CH_3$, —C(=O)O$CH_3$, —S—$CH_3$, —S(=O)$CH_3$, —S(=O)$_2CH_3$, —S(=O)$_2CH_2CH_3$, —S(=O)$_2NR^bR^c$, —S(=O)$_2$O$CH_3$, methyl, ethyl, n-propyl, isopropyl, n-butyl, tert-butyl, vinyl, ethynyl, methoxy, ethoxy, isopropoxy, tert-butoxy, trifluoromethyl, difluoromethyl, monofluoromethyl, 2,2-difluoroethyl, trifluoromethoxy, methylamino, dimethylamino, cyclopropyl, cyclobutyl, cyclopentyl, cyclohexyl, phenyl, naphthyl, oxiranyl, azetidinyl, oxetanyl, tetrahydrofuranyl, pyrrolidinyl, piperidinyl, morpholinyl, pyrrolyl, pyridyl, pyrimidinyl or quinolinyl; or $R^5$ and $R^6$ together with the carbon atom to which they are attached, form cyclobutene, cyclopentene, cyclohexene, benzene, dihydrofuran, dihydrothiazole, dihydroimidazole, dihydropyrazole, dihydrooxazole, dihydropyrrole, tetrahydropyridine, dihydro-1,4-oxazine, pyrrole, pyridine, pyrimidine or quinoline, wherein each of the cyclobutene, cyclopentene, cyclohexene, benzene ring, dihydrofuran, dihydrothiazole, dihydroimidazole, dihydropyrazole, dihydrooxazole, dihydropyrrole, tetrahydropyridine, dihydro-1,4-oxazine, pyrrole, pyridine, pyrimidine and quinoline is independently unsubstituted or substituted with 1, 2, 3, 4 or 5 substituents independently selected from =O, D, F, Cl, Br, OH, $NH_2$, SH, CN, $NO_2$, methyl, ethyl, n-propyl, isopropyl, n-butyl, tert-butyl, vinyl, ethynyl, methoxy, ethoxy, isopropoxy, tert-butoxy, trifluoromethyl, difluoromethyl, monofluoromethyl, 2,2-difluoroethyl, trifluoromethoxy, methylamino and dimethylamino;

each of $R^a$, $R^b$ and $R^c$ is independently H, D, methyl, ethyl, n-propyl, isopropyl, n-butyl, tert-butyl, trifluoromethyl, difluoromethyl, monofluoromethyl or 2,2-difluoroethyl.

In some embodiments, the compound having Formula (I) provided herein is preferably a compound having Formula (Ia) or a stereoisomer, a geometric isomer, a tautomer, an atropisomer, an N-oxide, a hydrate, a solvate, a metabolite, an ester, a pharmaceutically acceptable salt or a prodrug thereof,

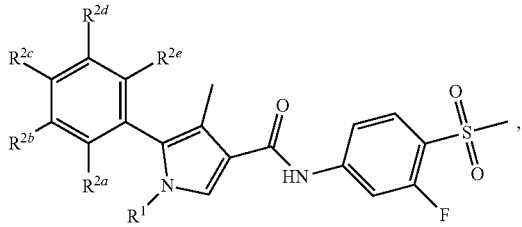

(Ia)

wherein, $R^1$, $R^{2a}$, $R^{2b}$, $R^{2c}$, $R^{2d}$ and $R^{2e}$ have the meanings described in the present invention.

In some embodiments, each of $R^{2a}$, $R^{2b}$, $R^{2c}$, $R^{2d}$ and $R^{2e}$ is independently H, D, F, Cl, Br, OH, $NH_2$, SH, CN, $NO_2$, —C(=O)$CH_3$, —C(=O)O$CH_3$, methyl, ethyl, n-propyl, isopropyl, n-butyl, tert-butyl, vinyl, ethynyl, methoxy, ethoxy, isopropoxy, tert-butoxy, trifluoromethyl, difluoromethyl, monofluoromethyl, 2,2-difluoroethyl, trifluoromethoxy, methylamino, dimethylamino, cyclopropyl, cyclobutyl, cyclopentyl, cyclohexyl, phenyl, naphthyl, oxiranyl, azetidinyl, oxetanyl, tetrahydrofuranyl, pyrrolidinyl, piperidinyl, morpholinyl, pyrrolyl, pyridyl, pyrimidinyl or quinolinyl.

In some embodiments, the compound having Formula (I) provided herein is preferably a compound having Formula (IIa) or a stereoisomer, a geometric isomer, a tautomer, an atropisomer, an N-oxide, a hydrate, a solvate, a metabolite, an ester, a pharmaceutically acceptable salt or a prodrug thereof,

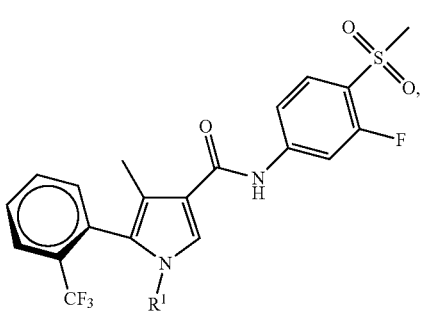

(IIa)

wherein, $R^1$ has the meaning described in the present invention.

In some embodiments, $R^1$ is $C_{1-4}$ alkyl, $C_{3-6}$ cycloalkyl, phenyl, 3-6 membered heterocyclyl or 5-6 membered heteroaryl, wherein the $C_{1-4}$ alkyl, $C_{3-6}$ cycloalkyl, phenyl, 3-6 membered heterocyclyl and the 5-6 membered heteroaryl are independently and optionally substituted by 1, 2, 3 or 4 $R^a$;

each $R^a$ is independently D, F, Cl, Br, OH, $NH_2$, SH, CN, $NO_2$, methyl, ethyl, n-propyl, isopropyl, n-butyl, tert-butyl, vinyl, ethynyl, methoxy, ethoxy, isopropoxy, tert-butoxy, trifluoromethyl, difluoromethyl, monofluoromethyl, 2,2-difluoroethyl, cyclopropyl, cyclobutyl, cyclopentyl, cyclohexyl, phenyl, naphthyl, oxiranyl, azetidinyl, oxetanyl, tetrahydrofuranyl, pyrrolidinyl, piperidinyl, morpholinyl, pyrrolyl, pyridyl, pyrimidinyl or quinolinyl; wherein the methyl, ethyl, n-propyl, isopropyl, n-butyl, tert-butyl, vinyl, ethynyl, methoxy, ethoxy, isopropoxy, tert-butoxy, difluoromethyl, monofluoromethyl, 2,2-difluoroethyl, cyclopropyl, cyclobutyl, cyclopentyl, cyclohexyl, phenyl, naphthyl, oxiranyl, azetidinyl, oxetanyl, tetrahydrofuranyl, pyrrolidinyl, piperidinyl, morpholinyl, pyrrolyl, pyridyl, pyrimidinyl and quinolinyl are independently unsubstituted or substituted with 1, 2, 3 or 4 substituents independently selected from D, F, Cl, Br, OH, $NH_2$, SH, CN, $NO_2$, $C_{1-4}$ alkyl, $C_{2-4}$ alkenyl, $C_{2-4}$ alkynyl, $C_{1-4}$ alkoxy and $C_{1-4}$ haloalkyl.

In some embodiments, $R^1$ is methyl, ethyl, n-propyl, isopropyl, n-butyl, tert-butyl, cyclopropyl, cyclobutyl, cyclopentyl, cyclohexyl, phenyl, oxiranyl, azetidinyl, oxetanyl, tetrahydrofuranyl, pyrrolidinyl, piperidinyl, morpholinyl, pyrrolyl, pyridyl or pyrimidine, wherein the methyl, ethyl, n-propyl, isopropyl, n-butyl, tert-butyl, cyclopropyl, cyclobutyl, cyclopentyl, cyclohexyl, phenyl, oxiranyl, azetidinyl, oxetanyl, tetrahydrofuranyl, pyrrolidinyl, piperidinyl, morpholinyl, pyrrolyl, pyridyl and pyrimidinyl are independently and optionally substituted by 1, 2, 3 or 4 $R^a$;

each $R^a$ is independently D, F, Cl, Br, OH, $NH_2$, SH, CN, $NO_2$, methyl, ethyl, n-propyl, isopropyl, n-butyl, tert-butyl, vinyl, ethynyl, methoxy, ethoxy, isopropoxy, tert-butoxy, trifluoromethyl, difluoromethyl, monofluoromethyl, 2,2-difluoroethyl, cyclopropyl, cyclobutyl, cyclopentyl, cyclohexyl, phenyl, naphthyl, oxiranyl, azetidinyl, oxetanyl, tetrahydrofuranyl, pyrrolidinyl, piperidinyl, morpholinyl, pyrrolyl, pyridyl, pyrimidinyl or quinolinyl; wherein the methyl, ethyl, n-propyl, isopropyl, n-butyl, tert-butyl, vinyl, ethynyl, methoxy, ethoxy, isopropoxy, tert-butoxy, difluoromethyl, monofluoromethyl, 2,2-difluoroethyl, cyclopropyl, cyclobutyl, cyclopentyl, cyclohexyl, phenyl, naphthyl, oxiranyl, azetidinyl, oxetanyl, tetrahydrofuranyl, pyrrolidinyl, piperidinyl, morpholinyl, pyrrolyl, pyridyl, pyrimidinyl and quinolinyl are independently unsubstituted or substituted with 1, 2, 3 or 4 substituents independently selected from D, F, Cl, Br, OH, $NH_2$, SH, CN, $NO_2$, methyl, ethyl, n-propyl, isopropyl, $C_{2-4}$ alkenyl, $C_{2-4}$ alkynyl, methoxy, ethoxy, isopropoxy, trifluoromethyl, difluoromethyl, monofluoromethyl and 2,2-difluoroethyl.

In another aspect, the present invention relates to a pharmaceutical composition comprising the compound of the present invention; optionally, the pharmaceutical composition further comprises at least one of pharmaceutically acceptable carriers, excipients, diluents, adjuvants and vehicles.

In some embodiments, the pharmaceutical composition provided herein further comprises one or more other active ingredients, and the other active ingredient is an ACE inhibitor, a renin inhibitor, an angiotensin II receptor antagonist, a β-receptor blocker, acetylsalicylic acid, a diuretic, a calcium antagonist, a statin, a digitalis derivative, a calcium sensitizer, a nitrate or an antithrombotic agent.

In one aspect, the present invention relates to the use of the compound or the pharmaceutical composition in the manufacture of a medicament for treating, preventing or alleviating the following diseases in patients: hyperaldosteronism, hypertension, chronic heart failure, sequelae of myocardial infarction, liver cirrhosis, non-alcoholic steatohepatitis, chronic kidney disease, diabetic nephropathy, renal failure, fibrosis and/or stroke.

In another aspect, the present invention relates to the use of the compound or the pharmaceutical composition in the manufacture of a medicament, wherein the medicament is used as a mineralocorticoid receptor antagonist.

DETAILED DESCRIPTION OF THE INVENTION

Definitions and General Terminology

Reference will now be made in detail to certain embodiments of the invention, examples of which are illustrated in the accompanying structures and formulas. The invention is intended to cover all alternatives, modifications, and equivalents which may be included within the scope of the present invention as defined by the claims. One skilled in the art will recognize many methods and materials similar or equivalent to those described herein, which could be used in the practice of the present invention. The present invention is in no way limited to the methods and materials described herein. In the event that one or more of the incorporated literature, patents, and similar materials differs from or contradicts this application, including but not limited to defined terms, term usage, described techniques, or the like, this application controls.

It is further appreciated that certain features of the invention, which are, for clarity, described in the context of separate embodiments, can also be provided in combination in a single embodiment. Conversely, various features of the invention which are, for brevity, described in the context of a single embodiment, can also be provided separately or in any suitable subcombination.

Unless defined otherwise, all technical and scientific terms used herein have the same meaning as is commonly understood by one skilled in the art to which this invention belongs. All patents and publications referred to herein are incorporated by reference in their entirety.

As used herein, the following definitions shall apply unless otherwise indicated. For purposes of this invention, the chemical elements are identified in accordance with the Periodic Table of the Elements, CAS version, and the Handbook of Chemistry and Physics, 75th Ed. 1994.

Additionally, general principles of organic chemistry are described in "Organic Chemistry", Thomas Sorrell, University Science Books, Sausalito: 1999, and Smith et al., "March's Advanced Organic Chemistry", John Wiley & Sons, New York: 2007, the entire contents of which are hereby incorporated by reference.

The grammatical articles "a", "an" and "the", as used herein, are intended to include "at least one" or "one or more" unless otherwise indicated herein or clearly contradicted by the context. Thus, the articles used herein refer to one or more than one (i.e. at least one) articles of the grammatical objects. By way of example, "a component" means one or more components, and thus, possibly, more than one component is contemplated and may be employed or used in an implementation of the described embodiments.

As used herein, "patient" refers to a human (including adults and children) or other animal. In some embodiments, "patient" refers to a human.

The term "comprise" is an open expression, it means comprising the contents disclosed herein, but don't exclude other contents.

"Stereoisomers" refers to compounds which have identical chemical constitution, but differ with regard to the arrangement of the atoms or groups in space. Stereoisomers include enantiomer, diastereomers, conformer (rotamer), geometric (cis/trans) isomer, atropisomer, etc.

"Enantiomers" refers to two stereoisomers of a compound which are non-superimposable mirror images of one another.

"Diastereomer" refers to a stereoisomer with two or more centers of chirality and whose molecules are not mirror images of one another. Diastereomers have different physical properties, e.g., melting points, boiling points, spectral properties or biological activities. Mixture of diastereomers may separate under high resolution analytical procedures such as electrophoresis and chromatography such as HPLC.

"Atropisomers" refer to structural isomers based on axial or planar chirality due to restricted intramolecular rotation. The compound of the present invention has two atropisomers. For example, the compound having formula (II) has two atropisomers, which is resulting from the axial chirality derived from the restriction of the rotation due to steric hindrance of the bond between the phenyl substituted by trifluoromethyl at the ortho position and the substituted pyrrole ring. The "atropisomer" of the present invention is any one of the two atropisomers of the compound provided herein. However, an atropisomer having more excellent pharmacological activity, stability, in vivo kinetic properties, safety, etc., and thus having advantageous properties as a drug is preferred. The separation of atropisomers can be accomplished by chiral resolution techniques, such as selective crystallization or high performance liquid chromatography.

Stereochemical definitions and conventions used herein generally follow S. P. Parker, Ed., McGraw-Hill Dictionary of Chemical Terms (1984) McGraw-Hill Book Company, New York; and Eliel, E. and Wilen, S., "Stereochemistry of Organic Compounds", John Wiley & Sons, Inc., New York, 1994.

Any asymmetric atom (e.g., carbon or the like) of the compound(s) disclosed herein can be present in racemic or enantiomerically enriched, for example the (R)-, (S)- or (R,S)-configuration. In certain embodiments, each asymmetric atom has at least 50% enantiomeric excess, at least 60% enantiomeric excess, at least 70% enantiomeric excess, at least 80% enantiomeric excess, at least 90% enantiomeric excess, at least 95% enantiomeric excess, or at least 99% enantiomeric excess in the (R)- or (S)-configuration.

Any resulting mixtures of stereoisomers can be separated on the basis of the physicochemical differences of the constituents, into the pure or substantially pure geometric isomers, enantiomers, diastereomers, for example, by chromatography and/or fractional crystallization. Cis and trans isomers are diastereomer.

The term "tautomer" or "tautomeric form" refers to structural isomers of different energies which are interconvertible via a low energy barrier. Where tautomerization is possible (e.g. in solution), a chemical equilibrium of tautomers can be reached. For example, protontautomers (also known as prototropic tautomers) include interconversions via migration of a proton, such as keto-enol and imine-enamine isomerizations. Valence tautomers include interconversions by reorganization of some of the bonding electrons. A specific example of keto-enol tautomerization is the interconversion of pentane-2,4-dione and 4-hydroxypent-3- en-2-one tautomers. Another example of tautomerization is phenol-keto tautomerization. The specific example of phenol-keto tautomerisms is pyridin-4-ol and pyridin-4(1H)-one tautomerism. Unless otherwise stated, all tautomeric forms of the compounds disclosed herein are within the scope of the invention.

As described herein, compounds disclosed herein may optionally be substituted with one or more substituents, such as are illustrated generally below, or as exemplified by particular classes, subclasses, and species of the invention.

Furthermore, what need to be explained is that the phrases "each . . . is independently" and "each of . . . and . . . is independently", unless otherwise stated, should be broadly understood, which can mean that the specific options expressed by the same symbol are independent of each other in different groups; or the specific options expressed by the same symbol are independent of each other in same groups. Similarly, the "independently" in the phrase " . . . independently and optionally" should be broadly understood.

The term "optional" or "optionally" refers to that a subsequently described event or circumstance may but need not occur, and that the description includes instances where the event or circumstance occurs and instances in which it does not. For example, "independently and optionally substituted by one or more . . . substituents" means that the group is unsubstituted or substituted by one or more identical or different substituents.

At each part of the present specification, substitutes of compounds disclosed herein are disclosed in groups or in ranges. It is specifically intended that the invention includes each and every individual subcombination of the members of such groups and ranges. For example, the term "$C_1$-$C_6$ alkyl" or "$C_{1-6}$ alkyl" specifically refers to independently disclosed methyl, ethyl, $C_3$ alkyl, $C_4$ alkyl, $C_5$ alkyl and $C_6$ alkyl; "$C_{1-4}$ alkyl" specifically refers to independently disclosed methyl, ethyl, $C_3$ alkyl (i.e. propyl, including n-propyl and isopropyl) and $C_4$ alkyl (i.e. butyl, including n-butyl, isobutyl, sec-butyl and tert-butyl).

At various places in the present specification, linking substituents are described. Where the structure clearly requires a linking group, the Markush variables listed for that group are understood to be linking groups. For example, if the structure requires a linking group and the Markush group definition for that variable lists "alkyl" or "aryl" then it is understood that the "alkyl" or "aryl" represents a linking alkylene group or arylene group, respectively.

The term "alkyl" or "alkyl group" refers to a saturated linear or branched-chain monovalent hydrocarbon group of 1-20 carbon atoms, wherein the alkyl group is optionally substituted with one or more substituents described herein. In some embodiments, the alkyl group contains 1-12 carbon atoms. In other embodiments, the alkyl group contains 1-6 carbon atoms, i.e. $C_{1-6}$ alkyl. In still other embodiments, the alkyl group contains 1-4 carbon atoms, i.e. $C_{1-4}$ alkyl. In yet other embodiments, the alkyl group contains 1-3 carbon atoms, i.e. $C_{1-3}$ alkyl. In some embodiments, the $C_{1-6}$ alkyl group described herein includes $C_{1-4}$ alkyl; in other embodiments, the $C_{1-6}$ alkyl described herein includes $C_{1-3}$ alkyl.

Some non-limiting examples of the alkyl group include methyl, ethyl, propyl (including n-propyl and isopropyl), butyl (including n-butyl, isobutyl, sec-butyl, tert-butyl), n-pentyl, 2-pentyl, 3-pentyl, 2-methyl-2-butyl, 3-methyl-2-butyl, 3-methyl-1-butyl, 2-methyl-1-butyl, n-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, n-heptyl, n-octyl, etc.

The term "alkoxy" refers to an alkyl group, as previously defined, attached to parent molecular moiety via an oxygen atom. Some non-limiting examples of the alkoxy group include methoxy, ethoxy, propoxy (including 1-propoxy or 2-propoxy), butoxy (including n-butoxy, isobutoxy, sec-butoxy, tert-butoxy), etc.

The term "haloalkyl" or "haloalkoxy" refer to an alkyl or alkoxy group is substituted by one or more halogen atoms. Some non-limiting examples of this include trifluoromethyl, difluoromethyl, monofluoromethyl, trifluoromethoxy, chloroethyl (for example, 2-chloroethyl), trifluoroethyl (including but not limited to, 2,2,2-trifluoroethyl), 2,2-difluoroethyl, 2-chloro-1-methylethyl, etc.

The term "amino" refers to the group —$NH_2$. The term "carboxy" refers to the group —COOH. The terms "hydroxyl", "cyano", "nitro" and "mercapto" represent the groups —OH, —CN, —$NO_2$, —SH, respectively. The term "oxo" represents the group =O.

The term "alkylamino" refers to the group —$NH_2$ is substituted by one or two alkyl groups, wherein the alkyl group has the meaning as described herein. Some non-limiting examples of the alkyl group include methylamino, ethylamino, methylethylamino, dimethylamino, etc.

The term "carbocyclyl" refers to a saturated or partially unsaturated ring having 3 to 14 ring carbon atoms as a monocyclic, bicyclic, or tricyclic ring system, which has one or more attachments attaching to the rest of the molecule, wherein the carbocyclyl is optionally substituted with the substituents described herein. The term "carbocyclic ring" can be used interchangeably with the term "carbocyclyl". Some non-limiting examples of the carbocyclic ring include cyclopropane, cyclobutane, cyclopentane, cyclohexane, cyclopentene, cyclohexene, cyclopentadiene, etc.

The term "cycloalkyl" refers to a saturated monocyclic, bicyclic or tricyclic ring system containing 3-12 ring carbon atoms. In some embodiments, cycloalkyl contains 3-10 ring carbon atoms, such as $C_{3-10}$ cycloalkyl; in other embodiments, cycloalkyl contains 3-8 ring carbon atoms, such as $C_{3-8}$ cycloalkyl; in still other embodiments, the cycloalkyl contains 3-6 ring carbon atoms, such as $C_{3-6}$ cycloalkyl. Examples of cycloalkyl groups include, but are not limited to, cyclopropyl, cyclobutyl, cyclopentyl, cyclohexyl, cycloheptyl, cyclooctyl, and the like. Wherein, as described in the present invention, $C_{3-8}$ cycloalkyl includes $C_{3-6}$ cycloalkyl; the $C_{3-6}$ cycloalkyl includes cyclopropyl, cyclobutyl, cyclopentyl and cyclohexyl. The cycloalkyl group may be optionally substituted with one or more substituents disclosed herein.

The term "heterocyclyl" refers to a saturated or partially unsaturated monocyclic, bicyclic or tricyclic ring system containing 3-12 ring atoms, in which at least one ring member is selected from nitrogen, sulfur and oxygen. Wherein, the heterocyclyl is non-aromatic and does not contain any aromatic ring. Unless otherwise specified, the heterocyclyl group may be carbon or nitrogen linked, and a —$CH_2$— group can be optionally replaced by a —C(=O)— group. In which, the sulfur can be optionally oxygenized to S-oxide, and the nitrogen can be optionally oxygenized to N-oxide. The term "heterocyclic ring" can be used interchangeably with the term "heterocyclic". Some non-limiting examples of the heterocyclic include ethylene oxide, azetidinyl, oxetanyl, pyrrolidinyl, tetrahydrofuranyl, tetrahydrothienyl, thiazolidinyl, pyrazolidinyl, oxazolidinyl, imidazolidinyl, isoxanyl oxazolidinyl, piperidinyl, piperazinyl or morpholinyl, etc. As described herein, the heterocyclic can be composed of 3-8 members or 3-6 members, the members are optionally selected from C, N, O or S and at least one member is N, O or S. Wherein the 3-8 membered heterocyclyl includes a heterocyclyl composed of 3-6 members; the 3-6 membered heterocyclyl includes a heterocyclyl composed of 3-5 members. Specifically, the 3-6 membered heterocyclyl includes, but is not limited to,

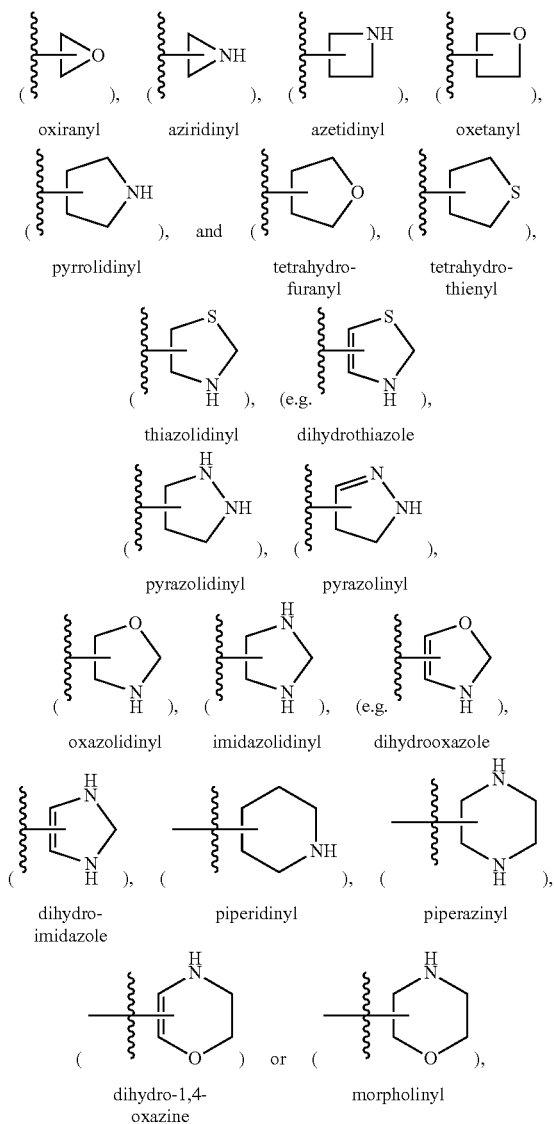

etc. The heterocyclyl group may be optionally substituted with one or more substituents disclosed herein.

The term "halogen" refers to fluorine (F), chlorine (Cl), bromine (Br) or iodine (I).

The term "aryl" refers to monocyclic, bicyclic and tricyclic carbocyclic ring systems having a total of 6 to 14 ring members, or 6 to 12 ring members, or 6 to 10 ring members, wherein at least one ring is aromatic and that has a single point or multipoint of attachment to the rest of the molecule. The term "aryl" and "aromatic ring" can be used interchangeably herein. Some non-limiting examples of the aryl group include phenyl, 2,3-dihydro-1H-indenyl, naphthalenyl and anthracenyl. The aryl group may be optionally substituted with one or more substituents disclosed herein. Unless otherwise specified, the group "$C_{6-10}$ aryl" refers to an aryl group containing 6-10 ring carbon atoms.

The term "heteroaryl" refers to monocyclic, bicyclic and tricyclic ring systems having a total of 5 to 12 ring members, 5 to 10 ring members, or 5 to 6 ring atoms, wherein at least one ring is aromatic, and in which at least one ring contains 1, 2, 3 or 4 ring heteroatoms selected from nitrogen, oxygen, and sulfur, and the heteroaryl has a single point or multipoint of attachment to the rest of the molecule. When a —$CH_2$— group is present in the heteroaryl, the —$CH_2$— group may be optionally replaced by —C(=O)—. Unless otherwise stated, the heteroaryl group may be connected to the rest of the molecule (such as the parent nucleus structure in the general formula) through any reasonable position (which may be C in CH or N in NH). The term "heteroaryl" and "heteroaromatic ring" or "heteroaromatic compound" can be used interchangeably herein. Some non-limiting examples of the heteroaryl include furyl, imidazolyl, pyrrolyl, pyrazolyl, pyridyl, pyrimidinyl, pyrazinyl, etc. The heteroaryl group may be optionally substituted with one or more substituents disclosed herein. In some embodiments, the heteroaryl is composed of 5-10 members, which refers to the heteroaryl containing 1-9 ring carbon atoms and 1, 2, 3 or 4 ring heteroatoms selected from O, S and N. In some embodiments, the heteroaryl is composed of 5-6 members, which refers to the heteroaryl containing 1-5 ring carbon atoms and 1, 2, 3 or 4 ring heteroatoms selected from O, S and N. Some non-limiting examples of the 5-6 membered heteroaryl include furyl, imidazolyl, isoxazolyl, oxazolyl, pyrrolyl, pyrazolyl, pyridyl, pyrimidinyl, pyridazinyl, pyrazinyl, thienyl, thiazolyl, etc.

The term "j-k membered" refers to the ring group consisted of j to k ring atoms, the ring atoms include carbon atom and/or heteroatoms such as O, N, S, P, and so on; the j and k are each independently any non-zero natural number, and k>j; the "j-k" includes j, k and any natural number between them. For example, "3-8 membered", "3-6 membered", "5-10 membered" or "5-6 membered" refers to the ring group consisted of 3-8, 5-10 or 5-6 ring atoms, the ring atoms include carbon atom and/or heteroatoms such as O, N, S, P, and so on.

The phrase "pharmaceutically acceptable" refers to molecular entities and compositions that are physiologically tolerable and do not typically produce an allergic or similar untoward reaction, such as gastric upset, dizziness and the like, when administered to a human. Preferably, as used herein, the term "pharmaceutically acceptable" means approved by a regulatory agency of the Federal or a state government or listed in the U.S. Pharmacopeia or other generally recognized pharmacopeia for use in animals, and more particularly in humans.

The term "carrier" refers to a diluent, adjuvant, excipient, or matrix with which the compound is administered. Such pharmaceutical carriers can be sterile liquids, such as water and oils, including those of petroleum, animal, vegetable or synthetic origin, such as peanut oil, soybean oil, mineral oil, sesame oil and the like. Water and aqueous solutions (e.g., saline solution, dextrose solution, glycerol solution) are preferably employed as carriers, especially injectable solutions. Suitable pharmaceutical carriers are described in "Remington's Pharmaceutical Sciences" by E. W. Martin.

The term "prodrug" refers to a compound that is transformed in vivo into a compound of Formula (I). Such a transformation can be affected, for example, by hydrolysis of the prodrug form in blood or enzymatic transformation to the parent form in blood or tissue. Prodrugs of the compounds disclosed herein may be, for example, esters. Some common esters which have been utilized as prodrugs are phenyl esters, aliphatic ($C_{1-24}$) esters, acyloxymethyl esters, carbonates, carbamates and amino acid esters. For example, a compound disclosed herein that contains a hydroxy group may be acylated at this position in its prodrug form. Other prodrug forms include phosphates, such as, those phosphate compounds are derived from the phosphonation of a hydroxy group on the parent compound. A thorough discussion of prodrugs is provided in T. Higuchi and V. Stella, Pro-drugs as Novel Delivery Systems, Vol. 14 of the A.C.S. Symposium Series, Edward B. Roche, ed., Bioreversible Carriers in Drug Design, American Pharmaceutical Association and Pergamon Press, 1987, J. Rautio et al., Prodrugs: Design and Clinical Applications, *Nature Review Drug Discovery*, 2008, 7, 255-270, and S. J. Hecker et al., Prodrugs of Phosphates and Phosphonates, *Journal of Medicinal Chemistry*, 2008, 51, 2328-2345, all of which are incorporated herein by reference in their entireties.

A "metabolite" is a product produced through metabolism in the body of a specified compound or salt thereof. The metabolites of a compound may be identified using routine techniques known in the art and their activities determined using tests such as those described herein. Such products may result for example from oxidation, reduction, hydrolysis, amidation, deamidation, esterification, deesterification, enzyme cleavage, and the like, of the administered compound. Accordingly, the invention includes metabolites of compounds disclosed herein, including metabolites produced by contacting a compound disclosed herein with a mammal for a sufficient time period.

A "pharmaceutically acceptable salts" refers to organic or inorganic salts of a compound disclosed herein. Pharmaceutically acceptable salts are well known in the art. For example, S. M. Berge et al., describe pharmaceutically acceptable salts in detail in J. Pharmaceutical Sciences, 1977, 66: 1-19, which is incorporated herein by reference. Some non-limiting examples of pharmaceutically acceptable and nontoxic salts include salts formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid, malonic acid, etc. or by using other methods used in the art such as ion exchange. Other pharmaceutically acceptable salts include those obtained by reacting with an appropriate base, including alkali metal, alkaline earth metal, ammonium and $N^+(C_{1-4}$ alkyl$)_4$ salts. This invention also envisions the quaternization of any basic nitrogen-containing groups of the compounds disclosed herein. Water or oil soluble or dispersable products may be obtained by such quaternization. Alkali metals or alkaline earth metals that can form salts include sodium, lithium, potassium, calcium, magnesium, and the like. Further pharmaceutically acceptable salts include appropriate and non-toxic ammonium, quaternary ammonium, and amine cations formed using counterions, such as halide, hydroxide, carboxylate, sulfate, phosphate, nitrate, $C_{1-8}$ sulfonate or aryl sulfonate.

The term "solvate" refers to an association or complex of one or more solvent molecules and a compound disclosed herein. Examples of solvents that form solvates include, but are not limited to, water, isopropanol, ethanol, methanol, DMSO, ethyl acetate, acetic acid and ethanolamine. The term "hydrate" refers to the complex where the solvent molecule is water.

An "ester" refers to an in vivo hydrolysable ester of a compound containing a hydroxyl group or a carboxyl group. for example, a pharmaceutically acceptable ester which is hydrolysed in the human or animal body to produce the parent alcohol or acid. The compound having Formula (I) of the present invention contains carboxyl group, which can form a hydrolyzable ester in vivo with an appropriate group. Such groups include, but are not limited to, alkyl, arylalkyl and the like.

An "N-oxide" refers to one or more than one nitrogen atoms oxidised to form an N-oxide, where a compound contains several amine functions. Particular examples of N-oxides are the N-oxides of a tertiary amine or a nitrogen atom of a nitrogen-containing heterocycle. N-oxides can be formed by treatment of the corresponding amine with an oxidizing agent such as hydrogen peroxide or a per-acid (e.g., a peroxycarboxylic acid) (See, Advanced Organic Chemistiy, by Jerry March, 4th Edition, Wiley Interscience, pages). More particularly, N-oxides can be made by the procedure of L. W. Deady (Syn. Comm. 1977, 7, 509-514) in which the amine compound is reacted with m-chloroperoxybenzoic acid (MCPBA), for example, in an inert solvent such as dichloromethane.

The "compounds provided herein", "compounds of the present invention", "compounds described herein", "compounds described in the present invention" or similar expressions used herein refer to compounds represented by any general structure of the present invention. For example, the compound provided herein may refer to a compound having Formula (I) or Formula (Ia) or Formula (II) or Formula (IIa) in the present invention. The compound of the present invention also includes the specific compound in any one of the examples.

As used herein, the term "treat", "treating" or "treatment" of any disease or disorder refers in one embodiment, to ameliorating the disease or disorder (i.e., slowing or arresting or reducing the development of the disease or at least one of the clinical symptoms thereof). In another embodiment "treat", "treating" or "treatment" refers to alleviating or ameliorating at least one physical parameter including those which may not be discernible by the patient. In yet another embodiment, "treat", "treating" or "treatment" refers to modulating the disease or disorder, either physically, (e.g., stabilization of a discernible symptom), physiologically, (e.g., stabilization of a physical parameter), or both. In yet another embodiment, "treat", "treating" or "treatment" refers to preventing or delaying the onset or development or progression of the disease or disorder.

Any formula given herein is also intended to represent isotopically unenriched forms as well as isotopically enriched forms of the compounds. Isotopically enriched compounds have the structure depicted by the general formula given herein, except that one or more atoms are replaced by the atom having a selected atomic mass or mass number. Examples of isotopes that can be incorporated into compounds of the invention include isotopes of hydrogen, carbon, nitrogen, oxygen, phosphorous, fluorine, and chlorine, such as $^2$H (deuterium, D), $^3$H, $^{11}$C, $^{13}$C, $^{14}$C, $^{15}$N, $^{17}$O, $^{18}$O, $^{18}$F, $^{31}$P, $^{32}$P, $^{35}$P, $^{36}$Cl, $^{125}$I, respectively.

In another aspect, the compounds of the invention include isotopically enriched compounds as defined herein, for example those into which radioactive isotopes, such as $^3$H, $^{14}$C and $^{18}$F, or those into which non-radioactive isotopes, such as $^2$H and $^{13}$C are present. Such isotopically enriched compounds are useful in metabolic studies (with $^4$C), reaction kinetic studies (with, for example $^2$H or $^3$H), detection or imaging techniques, such as positron emission tomography (PET) or single-photon emission computed tomography (SPECT) including drug or substrate tissue distribution assays, or in radioactive treatment of patients. In particular, an $^{18}$F-enriched compound may be particularly desirable for PET or SPECT studies. Isotopically-enriched compounds of Formula (I) can generally be prepared by conventional techniques known to those skilled in the art or by processes analogous to those described in the accompanying Examples and Preparations using an appropriate isotopically-labeled reagent in place of the non-labeled reagent previously employed.

Further, substitution with heavier isotopes, particularly deuterium (i.e., 2H or D) may afford certain therapeutic advantages resulting from greater metabolic stability. For example, increased in vivo half-life or reduced dosage requirements or an improvement in therapeutic index. It is understood that deuterium in this context is regarded as a substituent of a compound of Formula (I). The concentration of such a heavier isotope, specifically deuterium, may be defined by the isotopic enrichment factor. The term "isotopic enrichment factor" as used herein means the ratio between the isotopic abundance and the natural abundance of a specified isotope. If a substituent in a compound of this invention is denoted deuterium, such compound has an isotopic enrichment factor for each designated deuterium atom of at least 3500 (52.5% deuterium incorporation at each designated deuterium atom), at least 4000 (60% deuterium incorporation), at least 4500 (67.5% deuterium incorporation), at least 5000 (75% deuterium incorporation), at least 5500 (82.5% deuterium incorporation), at least 6000 (90% deuterium incorporation), at least 6333.3 (95% deuterium incorporation), at least 6466.7 (97% deuterium incorporation), at least 6600 (99% deuterium incorporation), or at least 6633.3 (99.5% deuterium incorporation). Pharmaceutically acceptable solvates in accordance with the invention include those wherein the solvent of crystallization may be isotopically substituted, e.g. $D_2O$, $d_6$-acetone, DMSO-$d_6$.

Unless otherwise stated, all tautomeric forms of the compounds disclosed herein are within the scope of the invention. Additionally, unless otherwise stated, structures depicted herein are also meant to include compounds that differ only in the presence of one or more isotopically enriched atoms.

As used herein, the abbreviations for any protective groups, amino acids and other compounds are, unless otherwise indicated, in accord with their common usage, recognized abbreviations, or the IUPAC-IUB Commission on Biochemical Nomenclature (See, Biochem. 1972, 11: 942-944).

Description of Compounds of the Invention

The present invention provides a pyrrole amide compound that can competitively antagonize the mineralocorticoid receptor (MR) and the use thereof, as well as a pharmaceutical composition containing the compound and the compound or the pharmaceutical composition in the manufacture of a medicament for treating, preventing or alleviating hyperaldosteronism, hypertension, chronic heart failure, sequelae of myocardial infarction, liver cirrhosis, non-alcoholic steatohepatitis, chronic kidney disease, diabetic nephropathy, renal failure, fibrosis and/or stroke, and the like in patients. It was unexpectedly discovered through research that the change of the substitution position of F on the benzene ring connected to the amide has a greater impact on the properties of the compound; for example, when F is in the meta position of the acyl group, the activity of the compound (i.e., the compound provided herein) is the highest. In general, the compound provided herein has excellent mineralocorticoid receptor antagonistic activity and excellent pharmacokinetic properties; furthermore, the compound has substantially no phototoxicity.

In one aspect, provided herein is a compound having Formula (I) or a stereoisomer, a geometric isomer, a tautomer, an atropisomer, an N-oxide, a hydrate, a solvate, a metabolite, an ester, a pharmaceutically acceptable salt or a prodrug thereof,

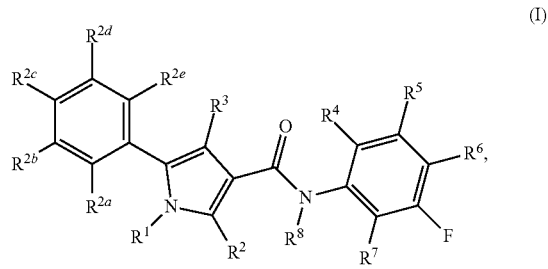

(I)

wherein, $R^1$, $R^2$, $R^{2a}$, $R^{2b}$, $R^{2c}$, $R^{2d}$, $R^{2e}$, $R^3$, $R^4$, $R^5$, $R^6$, $R^7$ and $R^8$ have the meanings as described in this invention.

In some embodiments, each of $R^2$ and $R^3$ is independently H, D, F, Cl, Br, OH, $NH_2$, SH, CN, $NO_2$, $C_{1-6}$ alkyl, $C_{2-6}$ alkenyl, $C_{2-6}$ alkynyl or $C_{1-6}$ haloalkyl.

In some embodiments, each of $R^2$ and $R^3$ is independently H, D, F, Cl, Br, OH, $NH_2$, SH, CN, $NO_2$, $C_{1-4}$ alkyl, $C_{2-4}$ alkenyl, $C_{2-4}$ alkynyl or $C_{1-4}$ haloalkyl.

In some embodiments, each of $R^2$ and $R^3$ is independently H, D, F, Cl, Br, OH, $NH_2$, SH, CN, $NO_2$, methyl, ethyl, n-propyl, isopropyl, trifluoromethyl or difluoromethyl.

In some embodiments, each of $R^4$, $R^5$, $R^6$ and $R^7$ is independently H, D, F, Cl, Br, OH, $NH_2$, SH, CN, $NO_2$, —C(=O)$C_{1-6}$ alkyl, —C(=O)O$C_{1-6}$ alkyl, —S—$C_{1-6}$ alkyl, —S(=O)$C_{1-6}$ alkyl, —S(=O)$_2C_{1-6}$ alkyl, —S(=O)$_2$N$R^bR^c$, —S(=O)$_2$O$C_{1-6}$ alkyl, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy, $C_{1-6}$ alkylamino, $C_{3-6}$ cycloalkyl, $C_{6-10}$ aryl, 3-6 membered heterocyclyl or 5-10 membered heteroaryl, wherein $R^b$ and $R^c$ have the meanings described in the present invention; or $R^5$ and $R^6$ together with the carbon atom to which they are attached, form a $C_{3-6}$ carbocyclic ring, a $C_{6-10}$ aromatic ring, a 3-6 membered heterocyclic ring or a 5-10 membered heteroaromatic ring, wherein each of the $C_{3-6}$ carbocyclic ring, $C_{6-10}$ aromatic ring, 3-6 membered heterocyclic ring and the 5-10 membered heteroaromatic ring is independently unsubstituted or substituted with 1, 2, 3, 4 or 5 substituents independently selected from =O, D, F, Cl, Br, OH, $NH_2$, SH, CN, $NO_2$, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy and $C_{1-6}$ alkylamino.

In some embodiments, each of $R^4$, $R^5$, $R^6$ and $R^7$ is independently H, D, F, Cl, Br, OH, $NH_2$, SH, CN, $NO_2$, —C(=O)$C_{1-4}$ alkyl, —C(=O)O$C_{1-4}$ alkyl, —S—$C_{1-4}$ alkyl, —S(=O)$C_{1-4}$ alkyl, —S(=O)$_2C_{1-4}$ alkyl, —S(=O)$_2$N$R^bR^c$, —S(=O)$_2$O$C_{1-4}$ alkyl, $C_{1-4}$ alkyl, $C_{2-4}$ alkenyl, $C_{2-4}$ alkynyl, $C_{1-4}$ alkoxy, $C_{1-4}$ haloalkyl, $C_{1-4}$ haloalkoxy, $C_{1-4}$ alkylamino, $C_{3-6}$ cycloalkyl, $C_{6-10}$ aryl, 3-6 membered heterocyclyl or 5-6 membered heteroaryl, wherein $R^b$ and $R^c$ have the meanings described in the present invention; or $R^5$ and $R^6$ together with the carbon atom to which they are attached, form a $C_{3-6}$ carbocyclic ring, a benzene ring, a 3-6 membered heterocyclic ring or a 5-6 membered heteroaromatic ring, wherein each of the $C_{3-6}$ carbocyclic ring, benzene ring, 3-6 membered heterocyclic ring and 5-6 membered heteroaromatic ring is independently unsubstituted or substituted with 1, 2, 3, 4 or 5 substituents independently selected from =O, D, F, Cl, Br, OH, $NH_2$, SH, CN, $NO_2$, $C_{1-4}$ alkyl, $C_{2-4}$ alkenyl, $C_{2-4}$ alkynyl, $C_{1-4}$ alkoxy, $C_{1-4}$ haloalkyl, $C_{1-4}$ haloalkoxy and $C_{1-4}$ alkylamino.

In some embodiments, each of $R^4$, $R^5$, $R^6$, and $R^7$ is independently H, D, F, Cl, Br, OH, $NH_2$, SH, CN, $NO_2$, —C(=O)$CH_3$, —C(=O)O$CH_3$, —S—$CH_3$, —S(=O)$CH_3$, —S(=O)$_2CH_3$, —S(=O)$_2CH_2CH_3$, —S(=O)$_2NR^b R^c$, —S(=O)$_2OCH_3$, methyl, ethyl, n-propyl, isopropyl, n-butyl, tert-butyl, vinyl, ethynyl, methoxy, ethoxy, isopropoxy, tert-butoxy, trifluoromethyl, difluoromethyl, monofluoromethyl, 2,2-difluoroethyl, trifluoromethoxy, methylamino, dimethylamino, cyclopropyl, cyclobutyl, cyclopentyl, cyclohexyl, phenyl, naphthyl, oxiranyl, azetidinyl, oxetanyl, tetrahydrofuranyl, pyrrolidinyl, piperidinyl, morpholinyl, pyrrolyl, pyridyl, pyrimidinyl or quinolinyl, wherein, $R^b$ and $R^c$ have the meanings described in the present invention; or $R^5$ and $R^6$ together with the carbon atom to which they are attached, form cyclobutene, cyclopentene, cyclohexene, benzene, dihydrofuran, dihydrothiazole, dihydroimidazole, dihydropyrazole, dihydrooxazole, dihydropyrrole, tetrahydropyridine, dihydro-1,4-oxazine, pyrrole, pyridine, pyrimidine or quinoline, wherein each of the cyclobutene, cyclopentene, cyclohexene, benzene, dihydrofuran, dihydrothiazole, dihydroimidazole, dihydropyrazole, dihydrooxazole, dihydropyrrole, tetrahydropyridine, dihydro-1,4-oxazine, pyrrole, pyridine, pyrimidine and the quinoline is independently unsubstituted or substituted with 1, 2, 3, 4 or 5 substituents independently selected from =O, D, F, Cl, Br, OH, $NH_2$, SH, CN, $NO_2$, methyl, ethyl, n-propyl, isopropyl, n-butyl, tert-butyl, vinyl, ethynyl, methoxy, ethoxy, isopropoxy, tert-butoxy, trifluoromethyl, difluoromethyl, monofluoromethyl, 2,2-difluoroethyl, trifluoromethoxy, methylamino and dimethylamino.

Preferably, each of $R^4$, $R^5$ and $R^7$ is independently H or D, and $R^6$ is —S(=O)$_2CH_3$ or —S(=O)$_2CH_2CH_3$.

In some embodiments, each of $R^8$, $R^b$ and $R^c$ is independently H, D, $C_{1-6}$ alkyl or $C_{1-6}$ haloalkyl. In some embodiments, each of $R^8$, $R^b$ and $R^c$ is independently H, D, $C_{1-4}$ alkyl or $C_{1-4}$ haloalkyl.

In some embodiments, each of $R^8$, $R^b$ and $R^c$ is independently H, D, methyl, ethyl, n-propyl, isopropyl, n-butyl, tert-butyl, trifluoromethyl, difluoromethyl, monofluoromethyl or 2,2-difluoroethyl.

In some embodiments, the compound having Formula (I) provided herein is preferably a compound having Formula (Ia) or a stereoisomer, a geometric isomer, a tautomer, an atropisomer, an N-oxide, a hydrate, a solvate, a metabolite, an ester, a pharmaceutically acceptable salt or a prodrug thereof, wherein, $R^1$, $R^{2a}$, $R^{2b}$, $R^{2c}$, $R^{2d}$ and $R^{2e}$ have the meanings described in the present invention.

In some embodiments, each of $R^{2a}$, $R^{2b}$, $R^{2c}$, $R^{2d}$ and $R^{2e}$ is independently H, D, F, Cl, Br, OH, $NH_2$, SH, CN, $NO_2$, —C(=O)$C_{1-6}$ alkyl, —C(=O)O$C_{1-6}$ alkyl, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy, $C_{1-6}$ alkylamino, $C_{3-6}$ cycloalkyl, $C_{6-10}$ aryl, 3-6 membered heterocyclyl or 5-10 membered heteroaryl.

In some embodiments, each of $R^{2a}$, $R^{2b}$, $R^{2c}$, $R^{2d}$ and $R^{2e}$ is independently H, D, F, Cl, Br, OH, $NH_2$, SH, CN, $NO_2$, —C(=O)$C_{1-4}$ alkyl, —C(=O)O$C_{1-4}$ alkyl, $C_{1-4}$ alkyl, $C_{2-4}$ alkenyl, $C_{2-4}$ alkynyl, $C_{1-4}$ alkoxy, $C_{1-4}$ haloalkyl, $C_{1-4}$ haloalkoxy, $C_{1-4}$ alkylamino, $C_{3-4}$ cycloalkyl, $C_{6-10}$ aryl, 3-6 membered heterocyclyl or 5-6 membered heteroaryl.

In some embodiments, each of $R^{2a}$, $R^{2b}$, $R^{2c}$, $R^{2d}$ and $R^{2e}$ is independently H, D, F, Cl, Br, OH, $NH_2$, SH, CN, $NO_2$, —C(=O)$CH_3$, —C(=O)O$CH_3$, methyl, ethyl, n-propyl, isopropyl, n-butyl, tert-butyl, vinyl, ethynyl, methoxy, ethoxy, isopropoxy, tert-butoxy, trifluoromethyl, difluoromethyl, monofluoromethyl, 2,2-difluoroethyl, trifluoromethoxy, methylamino, dimethylamino, cyclopropyl, cyclobutyl, cyclopentyl, cyclohexyl, phenyl, naphthyl, oxiranyl, azetidinyl, oxetanyl, tetrahydrofuranyl, pyrrolidinyl, piperidinyl, morpholinyl, pyrrolyl, pyridyl, pyrimidinyl or quinolinyl.

In some embodiments, the compound having Formula (I) provided herein is preferably a compound having Formula (II) or a stereoisomer, a geometric isomer, a tautomer, an atropisomer, an N-oxide, a hydrate, a solvate, a metabolite, an ester, a pharmaceutically acceptable salt or a prodrug thereof,

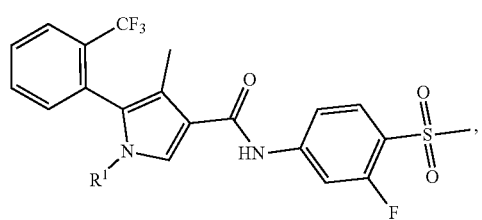

(II)

wherein, $R^1$ has the meaning described in the present invention.

In some embodiments, the compound having Formula (I) provided herein is preferably a compound having Formula (IIa) or a stereoisomer, a geometric isomer, a tautomer, an atropisomer, an N-oxide, a hydrate, a solvate, a metabolite, an ester, a pharmaceutically acceptable salt or a prodrug thereof,

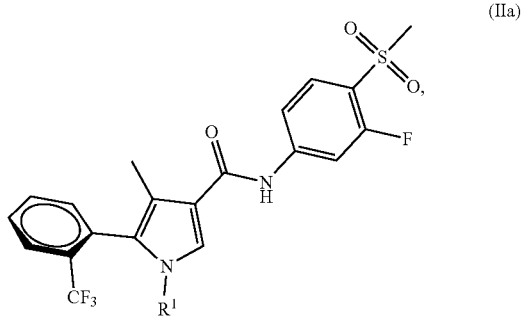

(IIa)

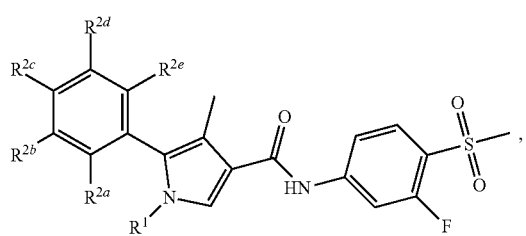

(Ia)

wherein, $R^1$ has the meaning described in the present invention.

In some embodiments, $R^1$ is $C_{1-6}$ alkyl, $C_{3-6}$ cycloalkyl, $C_{6-10}$ aryl, 3-6 membered heterocyclyl or 5-10 membered heteroaryl, wherein the $C_{1-6}$ alkyl, $C_{3-6}$ cycloalkyl, $C_{6-10}$ aryl, 3-6 membered heterocyclyl or 5-10 membered heteroaryl are independently and optionally substituted with 1, 2, 3 or 4 $R^a$; wherein $R^a$ has the meaning described herein.

In some embodiments, $R^1$ is $C_{1-4}$ alkyl, $C_{3-6}$ cycloalkyl, phenyl, 3-6 membered heterocyclyl or 5-6 membered heteroaryl, wherein the $C_{1-4}$ alkyl, $C_{3-6}$ cycloalkyl, phenyl, 3-6 membered heterocyclyl and 5-6 membered heteroaryl are independently and optionally substituted with 1, 2, 3 or 4 $R^a$; wherein $R^a$ has the meaning described herein.

In some embodiments, $R^1$ is methyl, ethyl, n-propyl, isopropyl, n-butyl, tert-butyl, cyclopropyl, cyclobutyl, cyclopentyl, cyclohexyl, phenyl, oxiranyl, azetidinyl, oxetanyl, tetrahydrofuranyl, pyrrolidinyl, piperidinyl, morpholinyl, pyrrolyl, pyridyl or pyrimidine, wherein the methyl, ethyl, n-propyl, isopropyl, n-butyl, tert-butyl, cyclopropyl, cyclobutyl, cyclopentyl, cyclohexyl, phenyl, oxiranyl, azetidinyl, oxetanyl, tetrahydrofuranyl, pyrrolidinyl, piperidinyl, morpholinyl, pyrrolyl, pyridyl and pyrimidine are independently and optionally substituted by 1, 2, 3 or 4 $R^a$; wherein $R^a$ has the meaning described herein.

In some embodiments, each $R^a$ is independently D, F, Cl, Br, OH, $NH_2$, SH, CN, $NO_2$, $C_{1-6}$ alkyl, $C_{2-6}$ alkenyl, $C_{2-6}$ alkynyl, $C_{1-6}$ alkoxy, $C_{1-6}$ haloalkyl, $C_{3-6}$ cycloalkyl, $C_{6-10}$ aryl, 3-6 membered heterocyclyl or 5-10 membered heteroaryl; wherein, the $C_{1-6}$ alkyl, $C_{2-6}$ alkenyl, $C_{2-6}$ alkynyl, $C_{1-6}$ alkoxy, $C_{1-6}$ haloalkyl, $C_{3-6}$ cycloalkyl, $C_{6-10}$ aryl, 3-6 membered heterocyclyl and 5-10 membered heteroaryl are independently unsubstituted or substituted with 1, 2, 3 or 4 substituents independently selected from D, F, Cl, Br, OH, $NH_2$, SH, CN, $NO_2$, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy, $C_{3-6}$ cycloalkyl, $C_{6-10}$ aryl, 3-6 membered heterocyclyl or 5-10 membered heteroaryl.

In some embodiments, each $R^a$ is independently D, F, Cl, Br, OH, $NH_2$, SH, CN, $NO_2$, $C_{1-4}$ alkyl, $C_{2-4}$ alkenyl, $C_{2-4}$ alkynyl, $C_{1-4}$ alkoxy, $C_{1-4}$ haloalkyl, $C_{3-4}$ cycloalkyl, $C_{6-10}$ aryl, 3-6 membered heterocyclyl or 5-6 membered heteroaryl; wherein, the $C_{1-4}$ alkyl, $C_{2-4}$ alkenyl, $C_{2-4}$ alkynyl, $C_{1-4}$ alkoxy, $C_{1-4}$ haloalkyl, $C_{3-6}$ cycloalkyl, $C_{6-10}$ aryl, 3-6 membered heterocyclyl and 5-6 membered heteroaryl are independently unsubstituted or substituted with 1, 2, 3 or 4 substituents independently selected from D, F, Cl, Br, OH, $NH_2$, SH, CN, $NO_2$, $C_{1-4}$ alkyl, $C_{2-4}$ alkenyl, $C_{2-4}$ alkynyl, $C_{1-4}$ alkoxy, $C_{1-4}$ haloalkyl, $C_{1-4}$ haloalkoxy, $C_{3-6}$ cycloalkyl, $C_{6-10}$ aryl, 3-6 membered heterocyclyl or 5-6 membered heteroaryl.

In some embodiments, each $R^a$ is independently D, F, Cl, Br, OH, $NH_2$, SH, CN, $NO_2$, methyl, ethyl, n-propyl, isopropyl, n-butyl, tert-butyl, vinyl, ethynyl, methoxy, ethoxy, isopropoxy, tert-butoxy, trifluoromethyl, difluoromethyl, monofluoromethyl, 2,2-difluoroethyl, cyclopropyl, cyclobutyl, cyclopentyl, cyclohexyl, phenyl, naphthyl, oxiranyl, azetidinyl, oxetanyl, tetrahydrofuranyl, pyrrolidinyl, piperidinyl, morpholinyl, pyrrolyl, pyridyl, pyrimidinyl or quinolinyl; wherein the methyl, ethyl, n-propyl, isopropyl, n-butyl, tert-butyl, vinyl, ethynyl, methoxy, ethoxy, isopropoxy, tert-butoxy, difluoromethyl, monofluoromethyl, 2,2-difluoroethyl, cyclopropyl, cyclobutyl, cyclopentyl, cyclohexyl, phenyl, naphthyl, oxiranyl, azetidinyl, oxetanyl, tetrahydrofuranyl, pyrrolidinyl, piperidinyl, morpholinyl, pyrrolyl, pyridyl, pyrimidinyl and quinolinyl are independently unsubstituted or substituted with 1, 2, 3 or 4 substituents independently selected from D, F, Cl, Br, OH, $NH_2$, SH, CN, $NO_2$, methyl, ethyl, n-propyl, isopropyl, $C_{2-4}$ alkenyl, $C_{2-4}$ alkynyl, methoxy, ethoxy, isopropoxy, trifluoromethyl, difluoromethyl, monofluoromethyl, 2,2-difluoroethyl, $C_{3-6}$ cycloalkyl, phenyl, 3-6 membered heterocyclyl or 5-6 membered heteroaryl.

In some embodiments, the compound provided herein having one of the following structures, or a stereoisomer, a geometric isomer, a tautomer, an atropisomer, an N-oxide, a hydrate, a solvate, a metabolite, an ester, a pharmaceutically acceptable salt or a prodrug thereof,

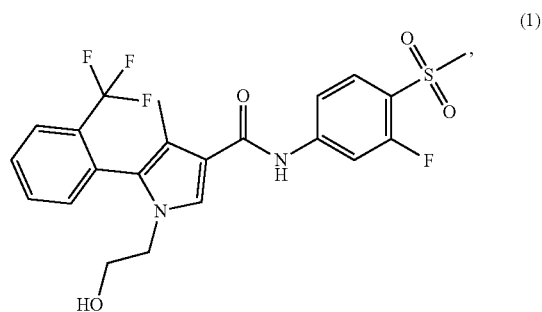

(1)

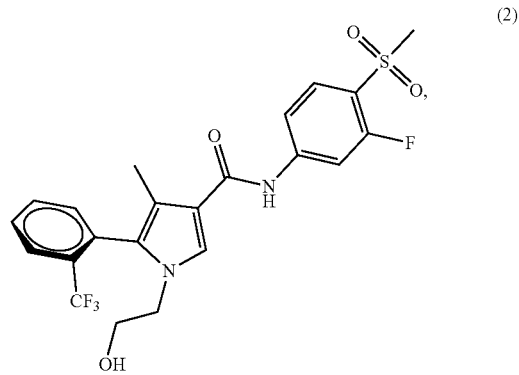

(2)

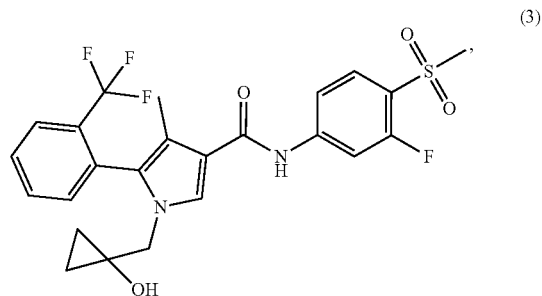

(3)

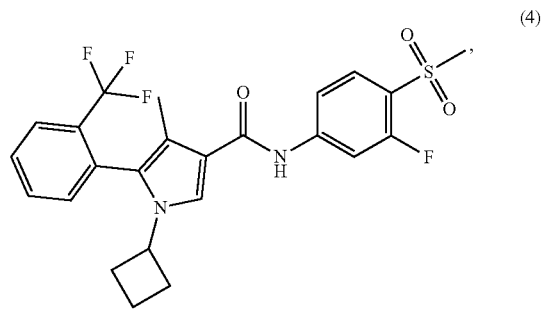

(4)

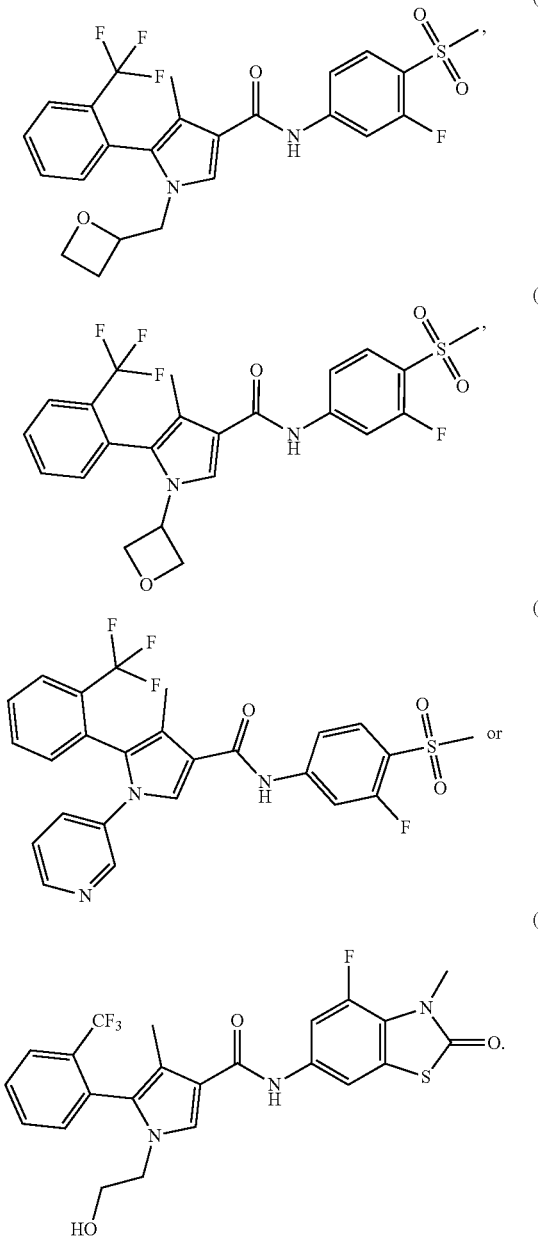

In other aspect, provided herein is a pharmaceutical composition comprising the compound disclosed herein.

In some embodiments, the pharmaceutical composition provided herein optionally comprises at least one of pharmaceutically acceptable carriers, excipients, diluents, adjuvants and vehicles.

In some other embodiments, the pharmaceutical composition provided herein further comprises one or more other active ingredients, wherein the other active ingredient is a ACE inhibitor, a renin inhibitor, an angiotensin II receptor antagonist, a β-receptor blocker, acetylsalicylic acid, a diuretic, a calcium antagonist, a statin, a digitalis derivative, a calcium sensitizer, a nitrate and/or an antithrombotic agent.

In one aspect, provided herein is use of the compound or the pharmaceutical composition disclosed herein in the manufacture of a medicament for treating, preventing or alleviating the following diseases in patients: hyperaldosteronism, hypertension, chronic heart failure, sequelae of myocardial infarction, liver cirrhosis, non-alcoholic steatohepatitis, chronic kidney disease, diabetic nephropathy, renal failure, fibrosis or stroke.

In other aspect, provided herein is use of the compound or the pharmaceutical composition disclosed herein in the manufacture of a medicament, wherein the medicament is used as a mineralocorticoid receptor antagonist.

In one aspect, provided herein is the compound or the pharmaceutical composition disclosed herein for use in treating, preventing or alleviating the following diseases in patients: hyperaldosteronism, hypertension, chronic heart failure, sequelae of myocardial infarction, liver cirrhosis, non-alcoholic steatohepatitis, chronic kidney disease, diabetic nephropathy, renal failure, fibrosis or stroke.

In other aspect, the compound or the pharmaceutical composition disclosed herein can be used as a mineralocorticoid receptor antagonist.

In one aspect, provided herein is a method for treating, preventing or alleviating the following diseases in patients: hyperaldosteronism, hypertension, chronic heart failure, sequelae of myocardial infarction, liver cirrhosis, non-alcoholic steatohepatitis, chronic kidney disease, diabetic nephropathy, renal failure, fibrosis or stroke, comprising administering to the subject a therapeutically effective amount of the compound or the pharmaceutical composition disclosed herein.

In other aspect, provided herein is a method for using the compound or pharmaceutical composition disclosed herein to antagonize the mineralocorticoid receptor, comprising contacting an organism (including in vivo or in vitro) with the compound or pharmaceutical composition disclosed herein in an effective dosage.

The compounds or pharmaceutical compositions disclosed herein competitively antagonize the mineralocorticoid receptor (MR), and therefore they can be useful agents for treating and preventing conditions associated with increased aldosterone levels.

The compound or pharmaceutical composition disclosed herein can be used to treat or prevent aldosterone receptor-mediated diseases. The present invention also provides a method for treating or reducing aldosterone receptor-mediated diseases, or sensitizing to these diseases in a patient comprising administering to the patient a therapeutically effective amount of the compound or pharmaceutical composition disclosed herein.

The present invention also comprises uses of the compound and pharmaceutically acceptable salts thereof in the manufacture of a medicine for treating mineralocorticoid receptor or aldosterone related diseases in patients, including those diseases described herein. The present invention provides a pharmaceutical composition comprising an effective therapeutic amount of the compound having Formula (I) required for combining with at least one pharmaceutically acceptable carrier, excipient, diluent, adjuvant, vehicle.

Unless otherwise stated, all hydrates, solvates and pharmaceutically acceptable salts of the compounds disclosed herein are within the scope of the invention.

Specifically, the salt is a pharmaceutically acceptable salt. The phrase "pharmaceutically acceptable" refers to that the substance or composition must be compatible chemically and/or toxicologically, with the other ingredients comprising a formulation, and/or the mammal being treated therewith.

The slats of the compounds disclosed herein also include salts of intermediates used for preparing and/or purifying compounds of Formula (I), or the salts of the isolated enantiomers of the compounds of Formula (I), but not necessarily pharmaceutically acceptable salts.

The salts of the compounds disclosed herein may be prepared by any suitable method available in the art, for example, treatment of the free base with an inorganic acid, such as hydrochloric acid, hydrobromic acid, sulfuric acid, nitric acid, phosphoric acid, and the like. or with an organic acid, such as acetic acid, maleic acid, succinic acid, mandelic acid, fumaric acid, malonic acid, pyruvic acid, oxalic acid, glycolic acid and salicylic acid; a pyranosidyl acid, such as glucuronic acid and galacturonic acid; an alpha-hydroxy acid, such as citric acid and tartaric acid; an amino acid, such as aspartic acid and glutamic acid; an aromatic acid, such as benzoic acid and cinnamic acid; a sulfonic acid, such as p-toluenesulfonic acid, ethanesulfonic acid and the like.

The biological activity of the compounds disclosed herein may be assessed by using any conventionally known methods. Appropriate detection methods are well known in the art. For example, the MR antagonistic activity, pharmacokinetic activity, and/or liver microsomal stability of the compounds disclosed herein can be tested by appropriate conventional methods. The detection method provided herein is presented only as an example and does not limit the present invention. The compounds disclosed herein have activity in at least one of the detection methods provided herein. For example, the compounds disclosed herein have good antagonistic activity against mineralocorticoid receptors and good in vivo pharmacokinetic properties, such as better absorption and exposure, and high bioavailability; in another example, the compounds disclosed herein have low toxic side effects.

Pharmaceutical Compositions, Formulations, Administration and Uses of the Compounds of the Present Invention In other aspect, the pharmaceutical composition of the invention comprises pyrrole amide compounds having Formula (I), Formula (Ia), Formula (II) or Formula (IIa), the compounds listed herein, or the compounds of Examples 1-8, and a pharmaceutically acceptable carrier, adjuvant, or excipient. The amount of the compound in the composition of the present invention can effectively treat or lessen mineralocorticoid receptor or aldosterone-related diseases in a subject.

As described above, the pharmaceutical compositions disclosed herein further comprise a pharmaceutically acceptable carrier, an adjuvant, or a vehicle, which, as used herein, includes any and all solvents, diluents, or other liquid vehicle, dispersion or suspension aids, surface active agents, isotonic agents, thickening or emulsifying agents, preservatives, solid binders, lubricants and the like, as suited to the particular dosage form desired. As described in the following: In Remington: Troy et al., Remington: The Science and Practice of Pharmacy, 21st ed., 2005, Lippincott Williams & Wilkins, Philadelphia, and Swarbrick et al., Encyclopedia of Pharmaceutical Technology, eds. 19881999, Marcel Dekker, New York, both of which are herein incorporated by reference in their entireties, discloses various carriers used in formulating pharmaceutically acceptable compositions and known techniques for the preparation thereof. Except insofar as any conventional carrier medium incompatible with the compounds disclosed herein, such as by producing any undesirable biological effect or otherwise interacting in a deleterious manner with any other components of the pharmaceutically acceptable composition, its use is contemplated to be within the scope of this invention.

Some non-limiting examples of materials which can serve as pharmaceutically acceptable carriers include ion exchangers; aluminium; aluminum stearate; lecithin; serum proteins such as human serum albumin; buffer substances such as phosphates; glycine; sorbic acid; potassium sorbate; partial glyceride mixtures of saturated vegetable fatty acids; water; salts or electrolytes such as protamine sulfate, disodium hydrogen phosphate, potassium hydrogen phosphate, sodium chloride and zinc salts; colloidal silica; magnesium trisilicate; polyvinyl pyrrolidone; polyacrylates; waxes; polyethylene-polyoxypropylene-block polymers; wool fat; sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; excipients such as cocoa butter and suppository waxes; oils such as peanut oil, cottonseed oil, safflower oil, sesame oil, olive oil, corn oil and soybean oil; glycols such as propylene glycol and polyethylene glycol; esters such as ethyl oleate and ethyl laurate; agar; buffering agents such as magnesium hydroxide and aluminum hydroxide; alginic acid; pyrogen-free water; isotonic saline; Ringer's solution; ethyl alcohol; and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants.

The pharmaceutical composition of the present invention can be administered directly or in a pharmaceutical composition or pharmaceutical form along with a suitable carrier or excipient, which is well known in the art. The treatment method of the present invention may comprise administering an effective compound of the present invention to an individual in need. In some embodiments, the individual is a mammalian individual, and in other preferred embodiments, the individual is a human individual.

The effective amount of the compound, pharmaceutical composition or drug of the present invention can be easily determined by routine test, and the most effective and convenient route of administration and the most suitable formulation can also be determined by routine test.

The pharmaceutical dosage form of the compound of the present invention can be provided in the form of an immediate release, controlled release, sustained release or target drug release system. For example, commonly used dosage forms include solutions and suspensions, (micro) emulsions, ointments, gels and patches, liposomes, tablets, dragees, soft or hard shell capsules, suppositories, ovules, implants, amorphous or crystalline powder, aerosol and freeze-dried formulations. Depending on the route of administration, special devices may be required to administer the drug, such as syringes and needles, inhalers, pumps, injection pens, applicators or special flask. Pharmaceutical dosage forms often consist of drugs, excipients, and container/sealing systems. One or more excipients (also known as inactive ingredients) can be added to the compounds of the present invention to improve or promote the manufacture, stability, administration and safety of the drug, and can provide a method to obtain the desired drug release curve. Therefore, the type of excipients added to the drugs may depend on various factors, such as the physical and chemical properties of the drugs, the route of administration, and the preparation steps. Pharmaceutical excipients exist in this field and include those listed in various pharmacopoeias. (Refer to U.S. Pharmacopeia (USP), Japanese Pharmacopoeia (JP), European Pharmacopoeia (EP) and British Pharmacopoeia (BP); publications of the Center for Drug Evaluation and Research (CEDR) of the U.S. Food and Drug Administration (www.fda.gov), such as Inactive Ingredient Guide, 1996;

Handbook of Pharmaceutical Additives by Ash and Ash, 2002; Synapse Information Resources, Inc., Endicott NY; etc.)

The pharmaceutical dosage form of the compound of the present invention can be manufactured by any method well known in the art, for example, by conventional mixing, sieving, dissolving, melting, granulating, making sugar-coated pills, pressing, suspending, squeezing, spray drying, grinding, emulsification, (nano/micron) encapsulation, encapsulation or freeze-drying process. As mentioned above, the composition of the present invention may include one or more physiologically acceptable inactive ingredients, which can promote the processing of active molecules into formulations for medical use.

The appropriate formulation depends on the desired route of administration. For example, for intravenous injection, the composition can be formulated in an aqueous solution, if necessary, using physiologically compatible buffers, including, for example, phosphate, histidine or citrate used to adjust the pH of the formulation, and tonicity agents such as sodium chloride or dextrose. For transmucosal or nasal administration, semi-solid, liquid preparations or patches may be preferred, and may contain penetration enhancers; such penetration enhancers are generally known in the art. For oral administration, the compounds can be formulated into liquid or solid dosage forms and used as immediate release or controlled release/sustained release formulations. Suitable dosage forms for oral administration by individuals include tablets, pills, dragees, hard and soft shell capsules, liquids, gels, syrups, ointments, suspensions and emulsions. The compounds also be formulated in rectal compositions such as suppositories or retention enemas, which, for example, contain conventional suppository matrix, such as cocoa butter or other glycerides.

Solid oral dosage forms can be obtained by using excipients, which include fillers, disintegrants, binders (dry and wet), dissolution retardants, lubricants, glidants, anti-adherents, cation exchange resins, humectants, antioxidants, preservatives, coloring agents and flavoring agents. These excipients can be synthetic or natural. Examples of the excipients include cellulose derivatives, citric acid, dicalcium phosphate, gelatin, magnesium carbonate, magnesium lauryl sulfate/sodium lauryl sulfate, mannitol, polyethylene glycol, polyvinylpyrrolidone, silicic acid salt, silicon dioxide, sodium benzoate, sorbitol, starch, stearic acid or its salt, sugar (i.e. dextrose, sucrose, lactose, etc.), talc, tragacanth mucilage, vegetable oil (hydrogenated) and wax. Ethanol and water can be used as granulation additives. In some cases, it is necessary to coat the tablet with, for example, a taste-masked film, a gastric acid resistant film, or a delayed release film. Natural and synthetic polymers are usually combined with colorants, sugar and organic solvents or water to coat tablets to produce dragees. When the capsule is superior to the tablet, the drug powder, suspension or solution can be delivered in a compatible hard-shell or soft-shell capsule form.

Compositions formulated for parenteral administration by injection are generally sterile and can be provided in unit dosage forms, such as ampoules, syringes, injection pens, or multi-dose containers. The latter usually contains a preservative. The composition can be the form of a suspension, solution or emulsion in an oily or aqueous carrier, and can contain preparation agents, such as buffers, tonicity agents, viscosity enhancers, surfactants, suspending and dispersing agents, antioxidants, biocompatible polymers, chelating agents and preservatives. Depending on the injection site, the carrier may contain water, vegetable oils, and/or organic co-solvents. In some cases, for lyophilized products or concentrates, parenteral formulations will be reconstituted or diluted before administration. The controlled release or sustained release depot formulation of the compound of the present invention may include injectable suspensions of nano/micro particles or nano/micro or non-micronized crystals. Other well-known matrices in the art, polymers, such as poly (lactic acid), poly (glycolic acid) or copolymers thereof, can be used as a controlled release/sustained release matrix. Other depot delivery systems can be provided in the form of implants and pumps that require incisions.

Suitable carriers for the compound of the present invention for intravenous injection are well known in the art and include water-based solutions containing alkalis (such as sodium hydroxide) for the formation of ionic compounds; sucrose or sodium chloride as tonicity agents; buffers containing phosphate or histidine. Co-solvents of polyethylene glycol can be added. These water-based systems can effectively dissolve the compounds of the present invention and produce low toxicity after systemic administration. Without destroying the solubility and toxicity characteristics, the ratio of the components of the solution system can be greatly changed. In addition, the characteristics of the components can be changed. For example, low-toxicity surfactants such as polysorbate or poloxamer can be used, polyethylene glycol or other co-solvents can also be used. Biocompatible polymer such as polyvinylpyrrolidone can be added, and dextrose can be replaced by other sugars or polyols.

The compounds of the invention can be used systemically and/or locally. They can be administered in a suitable manner, for example, oral administration, gastrointestinal administration, pulmonary administration, nasal administration, sublingual administration, translingual administration, buccal administration, rectal administration, dermal administration, transdermal administration, conjunctival administration, ear canal administration, or administration as a graft or stent. The compounds of the present invention are preferably administered orally or parenterally.

Suitable administration manner for oral administration are as follows: according to the prior art, the manners of administration that release the compounds of the present invention by rapid release and/or modified methods include crystalline and/or amorphous and/or dissolved forms of the compounds, such as tablet (an uncoated tablet or a tablet coated with a gastric tolerant or delayed dissolution or insoluble coating that controls the release of the compounds), tablet or film/flake that quickly shatter in the mouth, film/lyophilized body, capsule (e.g., hard or soft capsule), sugar-coated tablet, granule, pill, powder, emulsion, suspension, aerosol or solution.

Parenteral administration can bypass the absorption step (e.g., intravenous, intraarterial, intracardia, intraspine, or lumbar) or include absorption (e.g., intramuscular, subcutaneous, intradermal, transdermal, or intraperitoneal). Administration forms suitable for parenteral administration include formulations for injection and infusion in the form of solutions, suspensions, emulsions, lyophilized bodies or sterile powders.

For other routes of administration, suitable examples are inhaled drug forms (including powder inhalers, sprays), nasal drops, solutions or sprays, tablets for tongue, sublingual or buccal administration, films/flakes or capsules, suppositories, ear or eye formulations, vaginal capsules, aqueous suspensions (lotions, shock mixtures), lipophilic suspensions, ointments, creams, transdermal therapeutic systems (e.g. patches), emulsions (milch), paste, foam, spray powder, implant or stent.

The therapeutically effective amount of the compounds provided herein should be present in the above-mentioned pharmaceutical formulations at a concentration of about 0.1 to 99.5%, preferably about 0.5 to 95% by weight of the entire mixture.

In addition to the compounds of the present invention, the above-mentioned pharmaceutical formulations may also contain other pharmaceutical active ingredients.

The therapeutically effective amount can be estimated using various methods well known in the art. The initial dosage for animal studies can be based on the effective concentration established in the cell culture assay. The dosage range suitable for a human individual can be determined, for example, using data obtained from animal studies and cell culture assays. In some embodiments, the compounds of the present invention can be prepared as a medicament for oral administration. An exemplary dosage of the compounds of the present invention in a medicament for oral administration is about 0.01 to about 100 mg/kg (wherein kg refers to the body weight of the subject).

Usually the dosing regimen for medicaments for oral administration is three times a week, twice a week, once a week, three times a day, twice a day, or once a day. In some embodiments, the compounds of the present invention are administered as active ingredient in a total amount of about 0.001 to about 50 mg/kg body weight every 24 hours. In order to obtain the desired result, it may optionally be administered in the form of multiple single doses.

The effective amount or therapeutically effective amount or dosage of an agent (such as the compound of the present invention) refers to the amount of an agent or compound that causes improvement in individual symptoms or prolonged survival The toxicity and therapeutic efficacy of the molecule can be determined by standard medical procedures in cell cultures or laboratory animals, for example, by measuring $LD_{50}$ (the dosage that makes 50% of the population lethal) and $ED_{50}$ (the dosage that is therapeutically effective for 50% of the population). The dosage ratio of toxic effect to therapeutic effect is the therapeutic index, which can be expressed as $LD_{50}/ED_{50}$. A drug showing a high therapeutic index is preferred.

The effective amount or therapeutically effective amount is the amount of a compound or pharmaceutical composition that will elicit the biological or medical response in a tissue, system, animal, or human that is being sought by researchers, veterinarians, doctors, or other clinicians. The dosage is preferably within a range of circulating concentrations that include the $ED_{50}$ with little or no toxicity. The dosage can vary within this range, depending on the dosage form and/or the route of administration used. The correct formulation, route of administration, dosage, and interval between administrations should be selected according to the methods known in the art, considering the particularity of individual conditions.

The dosage and interval can be adjusted individually to provide a plasma level of the active part sufficient to achieve the desired effect; that is, the minimal effective concentration (MEC). The MEC of each compound will be different, but it can be estimated, for example, from in vitro data and animal experiments. The dosage necessary to obtain MEC will depend on individual characteristics and route of administration. In the case of local administration or selective uptake, the effective local concentration of the drug may not be related to plasma concentration.

The amount of the medicament or composition administered can be determined by various factors, including the sex, age and weight of the individual to be treated, the severity of the pain, the manner of administration, and the judgment of the prescribing physician.

When necessary, the composition of the present invention can be provided by a packaging or a dispensing device containing one or more unit dosage forms (containing the active ingredient). For example, the packaging or dispensing device may include metal or plastic foil (such as foam packaging) or glass and rubber stoppers. The packaging or dispensing device may be accompanied by instructions for medicines. It is also possible to prepare a composition containing the compound of the present invention formulated in a compatible pharmaceutical carrier, which is placed in an appropriate container, and labeled for the treatment of a specified condition.

The compound of the present invention can be used alone or, if necessary, in combination with other active compounds. The present invention also provides the combined use of drugs including at least one compound and one or more further active substances, especially the drugs for treating and/or preventing the diseases of the present invention.

The compounds of the present invention act as mineralocorticoid receptor antagonists and show an unexpected and valuable range of pharmacological effects. Therefore, the compounds are suitable for use as drugs for treating and/or preventing human and animal diseases.

The compounds of the present invention are suitable for preventing and/or treating various diseases and related diseases, especially the diseases characterized by increased plasma aldosterone concentration or changes in plasma aldosterone concentration relative to plasma renin concentration, or diseases related to these changes. For example, spontaneous primary aldosteronism, hyperaldosteronism associated with adrenal hyperplasia, adrenal adenoma and/or adrenal cancer, hyperaldosteronism associated with cirrhosis, hyperaldosteronism associated with heart failure, and hyperaldosteronism associated with essential hypertension (relative), etc.

Due to its mechanism of action, the compounds of the present invention are also suitable for preventing sudden cardiac death in patients with an increased risk of death from sudden cardiac death. These patients are especially suffering from one of the following conditions: primary and secondary hypertension, hypertensive heart disease with or without congestive heart failure, refractory hypertension, acute and chronic heart failure, coronary heart disease, stable and unstable angina pectoris, myocardial ischemia, myocardial infarction, dilated cardiomyopathy, congenital primary cardiomyopathy (such as Bmgada syndrome), cardiomyopathy caused by Chagas disease, shock, arteriosclerosis, atrial and ventricular arrhythmias, transient and ischemic attacks, stroke, inflammatory cardiovascular disorders, peripheral and cardiovascular disorders, peripheral blood flow disorders, arterial occlusive diseases (such as intermittent claudication), asymptomatic left ventricle dysfunction, myocarditis, cardiac hypertrophy, pulmonary hypertension, coronary and peripheral artery spasms, thrombosis, thromboembolic disorders and vasculitis.

The compounds of the present invention can additionally be suitable for preventing and/or treating the formation of edema, such as pulmonary edema, nephrogenic edema, or swelling lungs associated with heart failure, and restenosis after thrombolytic therapy, percutaneous transluminal angioplasty (PTA) and coronary angioplasty (PTCA), heart transplantation and bypass surgery.

The compounds of the present invention are also suitable for using as potassium-sparing diuretics and for treating electrolyte disorders, such as hypercalcemia, hypernatremia or hypokalemia.

The compounds of the present invention are also suitable for treating nephropathy, such as acute or chronic renal failure, hypertensive nephropathy, arteriosclerotic nephritis (chronic and interstitial), nephrosclerosis, chronic renal failure and cystic nephropathy, and for preventing kidney damage (e.g., kidney damage caused by immunosuppressive agents related to organ transplantation (for example, cyclosporin A) and for kidney cancer.

The compounds of the present invention can additionally be suitable for preventing and/or treating diabetes and diabetic sequelae, such as neuropathy and diabetic nephropathy.

The compounds of the present invention can be further used to prevent and/or treat microalbuminuria and proteinuria caused by diabetes or hypertension.

The compounds of the present invention can be further used to prevent and/or treat fibrotic diseases, e.g., renal fibrosis, pulmonary fibrosis (including idiopathic pulmonary fibrosis), liver fibrosis, etc.

The compounds of the present invention are also suitable for preventing and/or treating conditions associated with an increase in plasma glucocorticoid concentration or with a local increase in glucocorticoid concentration in tissues (such as the heart). For example, adrenal dysfunction (Cushing's syndrome) that leads to excessive production of glucocorticoids, adrenal tumor that leads to excessive production of glucocorticoids, and pituitary tumor, which autonomously produce ACTH (corticotropin) leading to adrenal hyperplasia and Cushing's disease.

The compounds of the present invention can additionally be used to prevent and/or treat obesity, metabolic syndrome and obstructive sleep apnea.

The compounds of the present invention can be further used to prevent and/or treat inflammatory disorders caused by viruses, spirochetes, fungi, bacteria or mycobacteria, and inflammatory disorders of unknown etiology, such as polyarthritis, lupus erythematosus, periarthritis or polyarteritis, dermatomyositis, scleroderma and sarcoidosis.

The compounds of the present invention can be further used to treat central nervous disorders, such as depression, anxiety and chronic pain, especially migraine, and neurodegenerative disorders, such as Alzheimer's disease and Parkinson's syndrome.

The compounds of the present invention are also suitable for preventing and/or treating vascular damage, such as vascular damage caused by reocclusion or restenosis after percutaneous transluminal coronary angioplasty (PTCA), stent implantation, coronary angioscopy and bypass surgery, and endothelial dysfunction, Raynaud's disease, thromboangiitis obliterans (Buerger's syndrome) and tinnitus syndrome.

The compound of the present invention can be used alone, or if necessary, can be used in combination with other active ingredients. The present invention further relates to a medicament comprising at least one compound provided herein and one or more other active ingredients (especially for treating and/or preventing the aforementioned conditions). The other active ingredients include, but are not limited to: active ingredients that lower blood pressure, for example, preferably selected from calcium antagonists, angiotensin II receptor antagonists, ACE inhibitors, endothelin antagonists, renin inhibitors, α-receptor blockers, β-receptor blockers and Rho kinase inhibitors; diuretics, especially loop diuretics, and thiazides and thiazide diuretics; agents with antithrombotic effect, for example, preferably selected from platelet aggregation inhibitors, anticoagulants or fibrinolytic substances; active ingredients that alter lipid metabolism, for example, preferably selected from thyroid receptor agonists, cholesterol synthesis inhibitors, such as HMG-coenzyme A reductase inhibitors or squalene synthesis inhibitors, ACAT inhibitors, CETP inhibitors agents, MTP inhibitors, PPAR-α, PPAR-γ and/or PPAR-δ agonists, cholesterol absorption inhibitors, lipase inhibitors, polymeric bile adsorbents, bile acid reabsorption inhibitors and lipoprotein (a) antagonist; organic nitrates and NO donors, for example, sodium nitroprusside, nitroglycerin, isosorbide mononitrate, isosorbide dinitrate, doramine or SIN-1, and inhaled NO; compounds with positive inotropic effects, for example, cardiac glycosides (digoxin), β-adrenergic and dopaminergic agonists, such as isoproterenol, epinephrine, norepinephrine, dopamine and dobutamine; compounds that inhibit the breakdown of cyclic-guanosine phosphate (cGMP) and/or cyclic-adenosine phosphate (cAMP), for example, phosphodiesterase (PDE) 1, 2, 3, 4 and/or 5 inhibitors, especially PDE5 inhibitors, such as sildenafil, vardena fife and tadalafil, and PDE3 inhibitors, such as aminone and milrinone; natriuretic peptides, for example, atrial natriuretic peptide (ANP, anaritide), B-type natriuretic peptide or brain natriuretic peptide (BNP, nesiritide), C-type natriuretic peptide (CNP) and uroexpandin; calcium sensitizers, for example, preferably levosimendan; NO-independent but heme-dependent guanylate cyclase stimulator, especially the compounds described in WO 00/06568, WO00/06569, WO02/42301 and WO03/095451 (for example, Riociguat); NO- and heme-independent guanylate cyclase activator, especially the compounds described in WO 01/19355, WO 01/19776, WO 01/19778, WO 02/070462 and WO 02/070510; human neutrophil elastase (HNE) inhibitors, for example, sivelepristone or DX-890 (Reltran); compounds that inhibit the signal transduction cascade, for example, tyrosine kinase inhibitor, especially Sorafenib, Imatinib, Gefitinib and Erlotinib; and/or compounds that affect cardiac energy metabolism, such as Emoxer, Dichloroacetate, Ranolazine or Trimetazidine.

The compound of the present invention can also be administered in combination with other active ingredients other than the above-mentioned active ingredients. For example, in the preferred embodiments, the compound of the present invention is administered in combination with a diuretic, such as furosemide, bumetanide, torsemide, benzflurazine, kurose, hydrochlorothiazide, hydrofluoromethiazine, mechlorothiazide, polithiazide, trichlorothiazide, chlorthalidone, indapamide, metolazone, quetzol, acetazolamide, dichlorobenzenesulfonamide, methazolamide, glycerol, isosorbide, mannitol, amiloride or triamterene.

General Synthetic Procedures

In the present invention, if the chemical name of the compound doesn't match the corresponding structure, the compound is characterized by the corresponding structure.

Generally, the compounds of the invention can be prepared by the methods described herein. The following non-limiting schemes and examples are presented to further exemplify the invention.

Persons skilled in the art will recognize that the chemical reactions described may be readily adapted to prepare a number of other compounds disclosed herein, and alternative methods for preparing the compounds disclosed herein are deemed to be within the scope disclosed herein. For example, the synthesis of non-exemplified compounds according to the invention may be successfully performed by modifications apparent to those skilled in the art, e.g., by appropriately protecting interfering groups, by utilizing other suitable reagents known in the art other than those described, and/or by making routine modifications of reaction conditions. Alternatively, other reactions disclosed herein or known in the art will be recognized as having applicability for preparing other compounds disclosed herein.

In the examples described below, unless otherwise indicated all temperatures are set forth in degrees Celsius. Unless otherwise stated, the reagents were purchased from commercial suppliers, such as Aldrich Chemical Company, Arco Chemical Company and Alfa Chemical Company, and the reagents have not been further purified when used. Common solvents were purchased from commercial suppliers such as Shantou XiLong Chemical Factory, Guangdong Guanghua Reagent Chemical Factory Co. Ltd., Guangzhou Reagent Chemical Factory, Tianjin YuYu Fine Chemical Ltd., Qingdao Tenglong Reagent Chemical Ltd., and Qingdao Ocean Chemical Factory.

Anhydrous THF, dioxane, toluene, and ether were obtained by refluxing the solvent with sodium. Anhydrous $CH_2Cl_2$ and $CHCl_3$ were obtained by refluxing the solvent with $CaH_2$. EtOAc, PE, hexane, DMAC and DMF were treated with anhydrous $Na_2SO_4$ prior use.

The reactions set forth below were done generally under a positive pressure of nitrogen or argon or with a drying tube (unless otherwise stated) in anhydrous solvents, and the reaction flasks were typically fitted with rubber septa for the introduction of substrates and reagents via syringe. Glassware was oven dried and/or heat dried.

Column chromatography was conducted using a silica gel column. Silica gel (300-400 mesh) was purchased from Qingdao Ocean Chemical Factory. 1H NMR spectra were recorded by a Bruker Avance 400 MHz spectrometer or Bruker Avance III HD 600 spectrometer, using $CDCl_3$, DMSO-$d_6$, $CD_3OD$ or acetone-$d_6$ (reported in ppm) as solvent, and using TMS (0 ppm) or chloroform (7.26 ppm) as the reference standard. When peak multiplicities are reported, the following abbreviations are used: s (singlet), d (doublet), t (triplet), m (multiplet), q (quartet), br (broadened), dd (doublet of doublets), dt (doublet of triplets), dq (doublet of quartetshttp://www.baidu.com/link?url=Ksg QYIVdei1DkLN7WQQvxOzAxiTSz-JTNhPZqZ4IEIVpv-KRSYT RCnwYzZk6GNRZfYGSXC2cU9Vk7PnVx6m_5jlimIRe9CxnKdOWOixtt-_W), ddd (doublet of doublet of doublets), ddt (doublet of doublet of triplets), dddd (doublet of doublet of doublet of doublets). Coupling constants, when given, were reported in Hertz (Hz).

Low-resolution mass spectral (MS) data were determined by an Agilent 6320 Series LC-MS spectrometer equipped with a G1312A binary pump and a G1316A TCC (column was operated at 30° C.). G1329A autosampler and G1315B DAD detector were applied in the analysis, and an ESI source was used in the LC-MS spectrometer.

Low-resolution mass spectral (MS) data were determined by an Agilent 6120 Series LC-MS spectrometer equipped with a G1311A quaternary pump and a G1316A TCC (column was operated at 30° C.). G1329A autosampler and G1315D DAD detector were applied in the analysis, and an ESI source was used on the LC-MS spectrometer.

Both LC-MS spectrometers were equipped with an Agilent Zorbax SB-C18, 2.1×30 mm, 5 m column. Injection volume was decided by the sample concentration. The flow rate was 0.6 mL/min. The HPLC peaks were recorded by UV-Vis wavelength at 210 nm and 254 nm. The mobile phase was 0.1% formic acid in acetonitrile (phase A) and 0.1% formic acid in ultrapure water (phase B). The gradient elution conditions were showed in Table 1:

TABLE 1

| The gradient condition of the mobile phase in Low-resolution mass spectrum analysis | | |
|---|---|---|
| Time (min) | A ($CH_3CN$, 0.1% HCOOH) | B ($H_2O$, 0.1% HCOOH) |
| 0-3 | 5-100 | 95-0 |
| 3-6 | 100 | 0 |
| 6-6.1 | 100-5 | 0-95 |
| 6.1-8 | 5 | 95 |

The HPLC method for testing the atropisomer excess (% ee) is as follows: chromatographic column: CHIRALPAK AS-H 4.6×250 mm 5 m; flow rate: 1.0 mL/min; column temperature: 30° C.; detection wavelength: 290 nm; diluent: ethanol; mobile phase A: 0.1% TFA:ETOH; mobile phase B: n-hexane; running time: 30 min. The gradient elution conditions were showed in Table 2:

TABLE 2

| Time (min) | A % | B % |
|---|---|---|
| 0 | 20 | 80 |
| 30 | 20 | 80 |

The peak area ratio of the S configuration and the R configuration is used to calculate the corresponding enantiomeric excess (% ee). The calculation formulas are as follows:

% ee of S configuration=(peak area ratio of S configuration−peak area ratio of R configuration)÷(peak area ratio of S configuration+peak area ratio of R configuration)×100; or % ee of R configuration=(R configuration peak area ratio−S configuration peak area ratio)÷(R configuration peak area ratio+S configuration peak area ratio)×100.

The following abbreviations are used throughout the specification:

DMSO-$d_6$ deuterated dimethyl sulfoxide; g grams; mg milligrams; mol moles; mmol millimoles; mL milliliters; μL microliters The following reaction schemes describe the steps for preparing the compounds disclosed herein. Wherein, unless otherwise stated, $R^1$, $R^{2a}$, $R^{2b}$, $R^{2c}$, $R^{2d}$ and $R^{2e}$ all have the meanings as described herein; $L^1$ is a leaving group such as Cl, Br, I, methylsulfonyl or p-toluenesulfonyl. Unless otherwise stated, the reaction in each step of the reaction scheme is carried out in a solvent inert to the reaction. The solvents inert to the reaction includes, but are not limited to, the solvents involved in the embodiments or their substitutes.

Schemes
Synthesis of Intermediate Compound S5
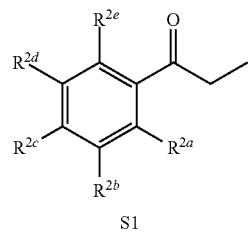
S1
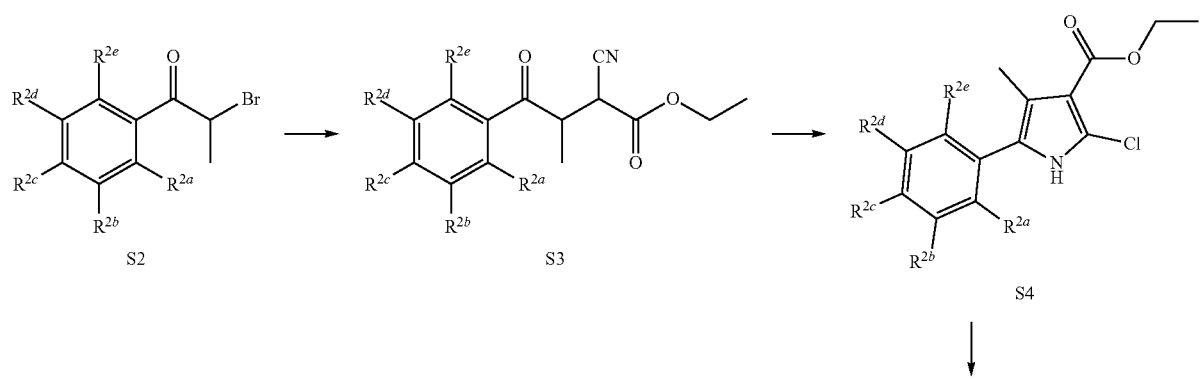
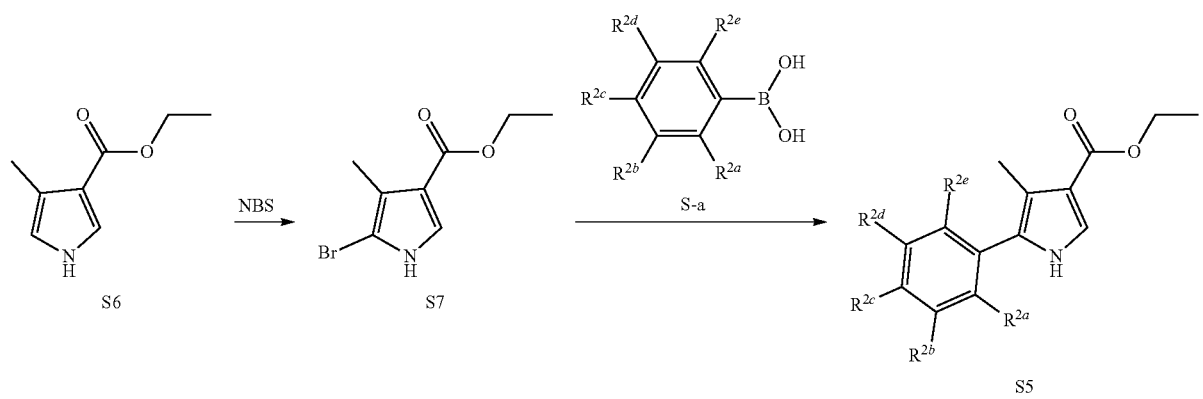

The intermediate compound S5 can be prepared by the following method: compound S1 undergoes substitution reaction with bromine to obtain compound S2; compound S2 undergoes substitution reaction with ethyl cyanoacetate to obtain compound S3; compound S3 reacts under acidic conditions to obtain compound S4, and finally, compound S4 undergoes dechlorination reaction under the action of a suitable hydrogen transfer reagent to obtain intermediate compound S5.

The intermediate compound S5 can also be prepared by the following method: compound S6 undergoes substitution reaction with N-bromosuccinimide (NBS) to obtain compound S7; compound S7 undergoes a coupling reaction with phenylboronic acid compound S-a to obtain intermediate compound S5.

Synthesis of Intermediate Compound S11

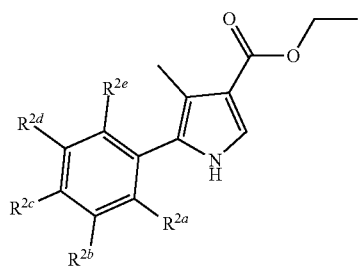
S5

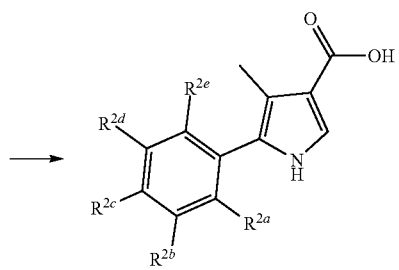
S8

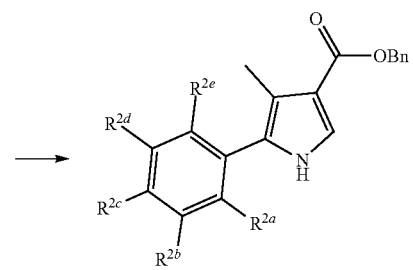
S9

L¹—R¹

L¹—R¹

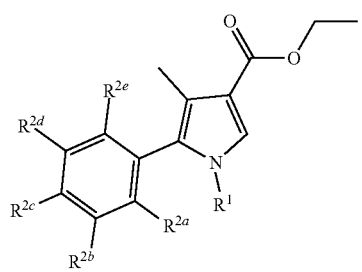
S10

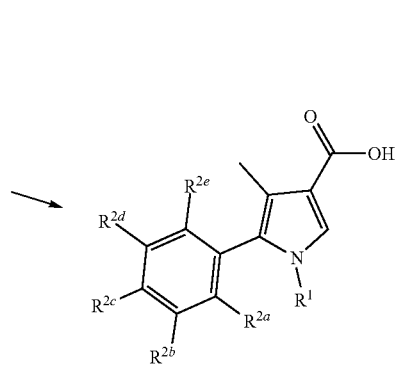
S11

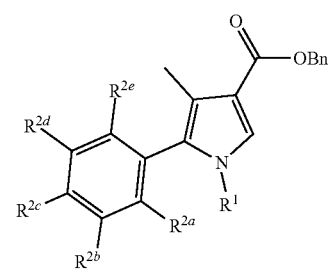
S12

The intermediate compound S11 can be prepared according to one of the following methods:

(1) compound S5 undergoes saponification reaction to obtain compound S8; compound S8 undergoes a substitution reaction with benzyl bromide under alkaline conditions to obtain intermediate compound S9; compound S9 reacts with appropriate reagent $L^1$-$R^1$ to obtain compound S12; compound S12 undergoes saponification reaction to obtain compound S11. or (2) compound S5 reacts with appropriate reagents $L^1$-$R^1$ to obtain compound S10; compound S10 undergoes saponification reaction to obtain compound S11.

Scheme 1

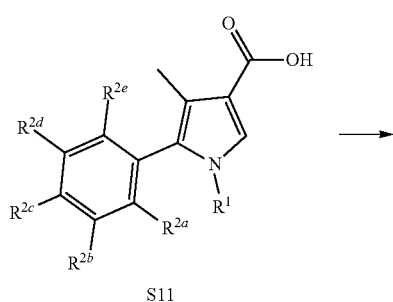

S11

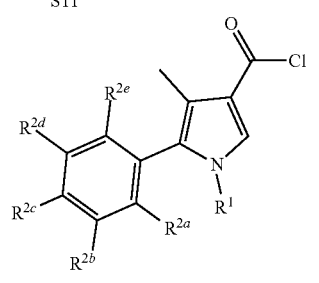

S14

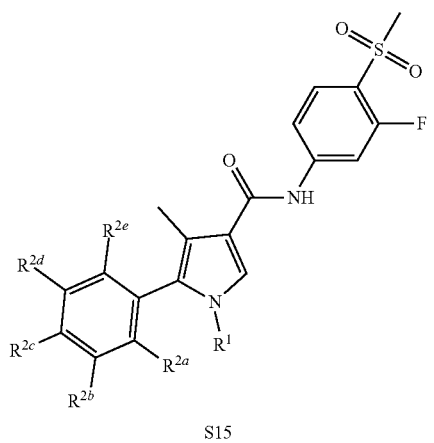

S15

Compound S15 can be prepared according to the method as described in Scheme 1. The reaction process is as follows: compound S11 reacts with a suitable acylating reagent (such as oxalyl chloride) to obtain compound S14; S14 undergoes an acylation reaction with 3-fluoro-4-methylsulfonyl aniline to obtain compound S15.

Scheme 2

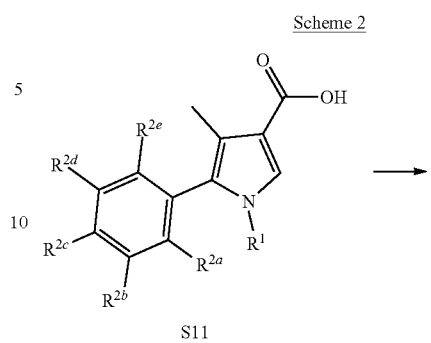

S11

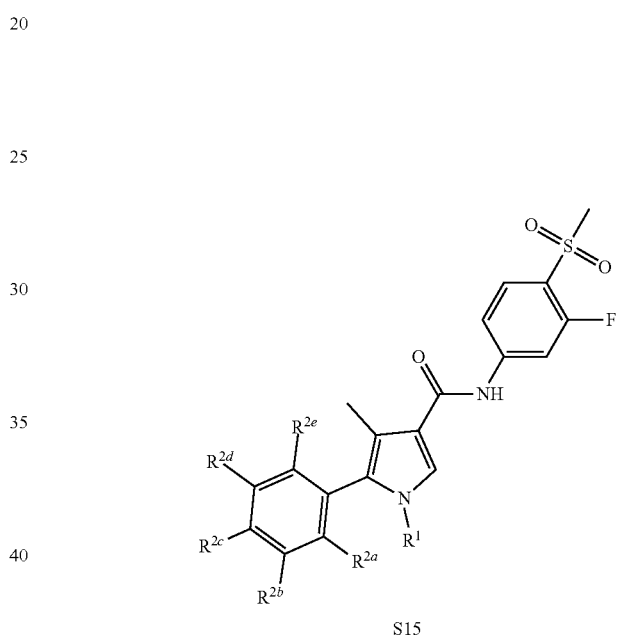

S15

Compound S15 can also be prepared according to the method as described in Scheme 2. The reaction process is as follows: Compound S11 undergoes a condensation reaction with 3-fluoro-4-methylsulfonyl aniline under the action of a suitable reagent (such as a condensation reagent) to obtain compound S15.

Scheme 3

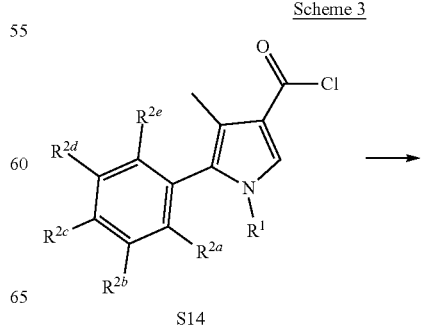

S14

-continued

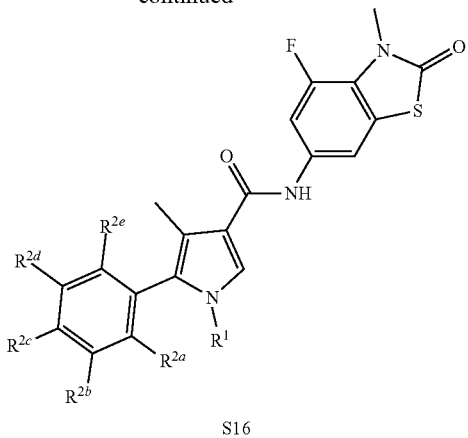

S16

Compound S16 can be prepared according to the method as described in Scheme 3. The reaction process is as follows: Compound S14 undergoes an acylation reaction with the corresponding aromatic amine substrate to obtain compound S16.

The following examples disclosed herein are presented to further describe the invention. However, these examples should not be used to limit the scope of the invention.

EXAMPLES

Intermediate 1 Synthesis of Ethyl 4-methyl-5-(2-(trifluoromethyl)phenyl)-1H-pyrrole-3-carboxylate

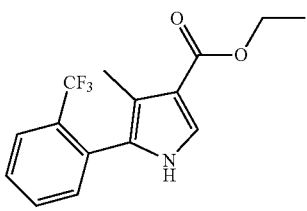 [SMILES: CCOC(=O)c1c[nH]c(-c2ccccc2C(F)(F)F)c1C]

Method One

Step 1) 2-bromo-1-(2-(trifluoromethyl)phenyl)propane-1-one

2'-(Trifluoromethyl)propiophenone (139 g, 687.5 mmol) was weighed and added into a 2000 mL four-necked flask, to the flask was added dichloromethane (800 mL), and then 1 drop of hydrobromic acid (content 48%) and 1 drop of liquid bromine were added. The color of bromine was found to fade under stirring, and then liquid bromine (121.5 g, 760.3 mmol) was added dropwise to the mixture. The mixture was stirred at room temperature for 0.5 h after addition. Saturated sodium sulfite solution (300 mL) was added to the flask, and the dichloromethane was removed by rotary evaporation under reduced pressure. Water (600 mL) and ethyl acetate (1000 mL) were added to the residue, and the organic phase was separated and washed with saturated brine (500 mL), dried with anhydrous sodium sulfate, filtered, and concentrated directly to obtain a pale yellow solid (193 g, 99.9%).

Step 2) Ethyl 2-cyano-3-methyl-4-oxo-4-(2-(trifluoromethyl)phenyl)butanoate

Potassium carbonate (166.6 g, 1205 mmol) was weighed and added into a 2000 mL flask, to the flask was added ethyl cyanoacetate (128 mL, 1203 mmol). The mixture was heated to 50° C. and stirred for 2 h. The flask was removed and cooled to room temperature, a solution of 2-bromo-1-(2-(trifluoromethyl)phenyl)propan-1-one (188 g, 668.9 mmol) in acetone (1000 mL) was added dropwise. The mixture was stirred at room temperature overnight after addition. The reaction solution was filtered with diatomite, and the filter cake was washed with acetone (50 mL×3). The filtrate was concentrated, extracted with ethyl acetate (200 mL×4). The organic phase was dried with anhydrous sodium sulfate, then filtered, and concentrated. The residue was separated by silica gel column chromatography (petroleum ether/ethyl acetate (v/v)=5/1) to obtain a beige solid (180.4 g, 86.09%).

MS (ESI, pos. ion) m/z: 314.2 (M+1).

Step 3) Ethyl 2-chloro-4-methyl-5-(2-(trifluoromethyl)phenyl)-1H-pyrrole-3-carboxylate Ethyl 2-cyano-3-methyl-4-oxo-4-(2-(trifluoromethyl)phenyl)butyrate (30 g, 95.8 mmol) was weighed and added into a 200 mL sealed tube, and to the sealed tube was added a solution of hydrogen chloride in ethyl acetate (120 mL, 480 mmol, 4 mol/L). The mixture was heated to 65° C. and reacted for 48 h after addition. The solvent was removed by rotary evaporation under reduced pressure, and the residue was separated by silica gel column chromatography (petroleum ether/ethyl acetate (v/v)=10/1) to obtain a beige solid (31.7 g, 99.8%).

MS (ESI, pos. ion) m/z: 332.0 (M+1).

Step 4) Ethyl 4-methyl-5-(2-(trifluoromethyl)phenyl)-1H-pyrrole-3-carboxylate

Ethyl 2-chloro-4-methyl-5-(2-(trifluoromethyl)phenyl)-1H-pyrrole-3-carboxylate (93.1 g, 281 mmol) was weighed and added into a 2000 mL flask, to the flask were added ethanol (635 mL), tetrahydrofuran (115 mL), water (47 mL), sodium formate (25.17 g, 370.1 mmol) and palladium on carbon (9.79 g, 10 mass %). The mixture was heated to 65° C. and stirred for 4.5 h after addition. The reaction solution was cooled to room temperature, to the reaction solution was added tetrahydrofuran (93 mL). The mixture was filtered with suction, the filter cake was washed with ethanol (93 mL×4), and the filtrate was concentrated. Water (750 mL) was added into the filtrate, and the resulting mixture stirred at room temperature overnight. The mixture was filtered with suction, and the filter cake was washed with a mixed solution of ethanol/water (280 mL, v/v=7/8). The filter cake was collected and dried under reduced pressure at 40° C. to obtain an off-white solid (71.3 g, 85.4%).

MS (ESI, pos. ion) m/z: 298.3 (M+1).

Method Two

Step 1) Ethyl 5-bromo-4-methyl-1H-pyrrole-3-carboxylate

Ethyl 4-methylpyrrole-3-carboxylate (6.0 g, 39 mmol) was weighed and added into a 100 mL flask, to the flask was added tetrahydrofuran (50 mL), then the mixture was cooled to −78° C. To the mixture was added N-Bromosuccinimide (6.99 g, 39.3 mmol), and the mixture was stirred at −78° C.

for 15 min, then 6 drops of pyridine was added, and the resulting mixture was slowly heated to 5° C. and stirred overnight. The reaction solution was extracted with ethyl acetate (100 mL×3). The organic phase was dried with anhydrous sodium sulfate, then filtered and concentrated. The residue was separated by silica gel column chromatography (petroleum ether/ethyl acetate (v/v)=10/1) to obtain a white solid (7.41 g, 82%).

MS (ESI, pos. ion) m/z: 232.1 (M+1).

$^1$H NMR (400 MHz, DMSO-$d_6$) δ (ppm) 11.97 (s, 1H), 7.40 (s, 1H), 4.15 (q, J=7.1 Hz, 2H), 2.11 (s, 3H), 1.24 (t, J=7.1 Hz, 3H).

Step 2) Ethyl 4-methyl-5-(2-(trifluoromethyl)phenyl)-1H-pyrrole-3-carboxylate Ethyl 5-bromo-4-methyl-1H-pyrrole-3-carboxylate (15.8 g, 68.1 mmol) was weighed and added into a 500 mL flask, to the flask were added 2-(trifluoromethyl)phenyl boronic acid (20.9 g, 110 mmol), lithium chloride (289.3 mg, 6.83 mmol), sodium carbonate solution (68 mL, 136 mmol, 2 mol/L), 1,4-dioxane (200 mL) and (1,1'-bis(diphenylphosphine)ferrocene)dichloride palladium dichloromethane complex (3.49 g, 4.19 mmol). The mixture was heated to 90° C. and reacted for 22 h after addition. The solvent was removed by rotary evaporation under reduced pressure, and the resulting mixture was extracted with ethyl acetate (80 mL×4) The organic phase was dried with anhydrous sodium sulfate, then filtered and concentrated. The residue was separated by silica gel column chromatography (petroleum ether/dichloromethane (v/v)=5/1) to obtain a white solid (6.9 g, 34%).

MS (ESI, pos. ion) m/z: 298.2 (M+1).

Example 1

N-(3-Fluoro-4-(methylsulfonyl)phenyl)-1-(2-hydroxyethyl)-4-methyl-5-(2-(trifluoromethyl)phenyl)-1H-pyrrole-3-carboxamide

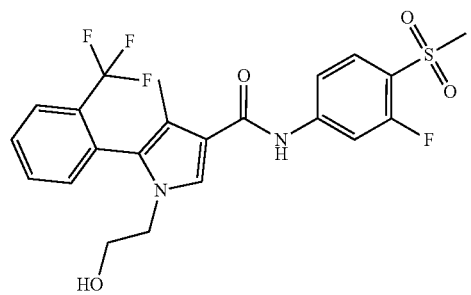 [SMILES: Cc1c(C(=O)Nc2ccc(S(C)(=O)=O)c(F)c2)cn(CCO)c1-c1ccccc1C(F)(F)F]

Step 1) Ethyl 1-(2-(benzyloxy)ethyl)-4-methyl-5-(2-(trifluoromethyl)phenyl)-1H-pyrrole-3-carboxylate Ethyl 4-methyl-5-(2-(trifluoromethyl)phenyl)-1H-pyrrole-3-carboxylate (25 g, 84.1 mmol) was weighed and added into a 500 mL flask, to the flask were added N,N-dimethylformamide (160 mL), cesium carbonate (41.7 g, 128 mmol) and benzyl 2-bromoethyl ether (16 mL, 101 mmol). The mixture was heated to 70° C. and stirred for 12 h after addition. The reaction solution was extracted with ethyl acetate (150 mL×3), the organic phases were combined and washed with saturated brine (150 mL×3). The resulting mixture was dried with anhydrous sodium sulfate, then filtered and concentrated. The residue was separated by silica gel column chromatography (petroleum ether/ethyl acetate (v/v)=10/1) to obtain a brown-yellow solid (36.2 g, 99.8%).

MS (ESI, pos. ion) m/z: 432.4 (M+1).

Step 2) 1-(2-(Benzyloxy)ethyl)-4-methyl-5-(2-(trifluoromethyl)phenyl)-1H-pyrrole-3-carboxylic Acid Ethyl 1-(2-(benzyloxy)ethyl)-4-methyl-5-(2-(trifluoromethyl)phenyl)-1H-pyrrole-3-carboxylate (36.2 g, 83.9 mmol) was weighed and added into a 1000 mL flask, to the flask were added sodium hydroxide solution (60 mL, 960 mmol, 16 mol/L) and ethanol (200 mL). The mixture was heated to 70° C. and stirred overnight after addition. The ethanol was removed by rotary evaporation under reduced pressure, water (1000 mL) was added to the residue and then the mixture was stirred at room temperature for 30 min. The resulting mixture was washed with methyl tert-butyl ether (200 mL×3), and the aqueous phase was adjusted to pH=2 with 6 M HCl solution, then extracted with ethyl acetate (200 mL×3). The organic layer was dried over anhydrous sodium sulfate, then filtered and concentrated to obtain a brown-yellow solid (33.4 g, 98.7%).

MS (ESI, pos. ion) m/z: 404.2 (M+1).

Step 3) 1-(2-(Benzyloxy)ethyl)-4-methyl-5-(2-(trifluoromethyl)phenyl)-1H-pyrrole-3-carbonyl Chloride 1-(2-(benzyloxy)ethyl)-4-methyl-5-(2-(trifluoromethyl)phenyl)-1H-pyrrole-3-carboxylic acid (401 mg, 0.994 mmol) was weighed and added into a 100 mL flask, to the flask were added dichloromethane (15 mL) and 2 drops of N,N-dimethylformamide. Then oxalyl chloride (0.40 mL, 4.7 mmol) was added dropwise under ice bath conditions. The mixture was reacted at room temperature for 2.5 h after addition. The solvent was removed by rotary evaporation under reduced pressure to obtain a brown-yellow solid (400 mg, 95.40%).

Step 4) 1-(2-(Benzyloxy)ethyl)-N-(3-fluoro-4-(methylsulfonyl)phenyl)-4-methyl-5-(2-(trifluoromethyl)phenyl)-1H-pyrrole-3-carboxamide 1-(2-(Benzyloxy)ethyl)-4-methyl-5-(2-(trifluoromethyl)phenyl)-1H-pyrrole-3-carbon yl chloride (400 mg, 0.948 mmol) was weighed and added into a 50 mL sealed tube, to the sealed tube were added tetrahydrofuran (10 mL), pyridine (0.14 mL, 1.7 mmol), 3-fluoro-4-methylsulfonylaniline (160 mg, 0.846 mmol) and 4-dimethylaminopyridine (10.7 mg, 0.0876 mmol). The mixture was heated to 80° C. and stirred overnight after addition. The solvent was removed by rotary evaporation under reduced pressure, and the residue was separated by silica gel column chromatography (petroleum ether/ethyl acetate (v/v)=2/1) to obtain a pale yellow solid (337 mg, 69.36%).

MS (ESI, pos. ion) m/z: 575.2 (M+1).

Step 5) N-(3-Fluoro-4-(methylsulfonyl)phenyl)-1-(2-hydroxyethyl)-4-methyl-5-(2-(trifluoromethyl)phenyl)-1H-pyrrole-3-carboxamide 1-(2-(benzyloxy)ethyl)-N-(3-fluoro-4-(methylsulfonyl)phenyl)-4-methyl-5-(2-(trifluoromethyl)phenyl)-1H-pyrrole-3-carboxamide (337 mg, 0.587 mmol) was weighed and added into a 100 mL flask, to the flask were added methanol (10 mL) and palladium on carbon (66.7 mg, 10 mass %). The mixture was stirred at room temperature for 1.5 h under $H_2$. The reaction solution was suction filtered by diatomite, the filter cake was washed with methanol (10 mL×3), the filtrate was concentrated, and the residue was separated by silica gel column chromatography (petroleum ether/ethyl acetate (v/v)= 1/2) to obtain a white solid (220.5 mg, 77.60%).

MS (ESI, pos. ion) m/z: 485.3 (M+1);

$^1$H NMR (400 MHz, DMSO-$d_6$) δ (ppm): 10.15 (s, 1H), 7.99 (dd, J=13.4, 1.1 Hz, 1H), 7.90 (d, J=7.7 Hz, 1H), 7.83-7.76 (m, 3H), 7.74-7.69 (m, 2H), 7.47 (d, J=7.4 Hz, 1H), 4.94 (t, J=4.8 Hz, 1H), 3.73-3.64 (m, 1H), 3.55-3.44 (m, 3H), 3.28 (s, 3H), 1.93 (s, 3H).

Example 2

(S)-1-(2-Hydroxyethyl)-4-methyl-N-(3-fluoro-4-(methylsulfonyl)phenyl)-5-(2-(trifluoromethyl)phenyl)-1H-pyrrole-3-carboxamide

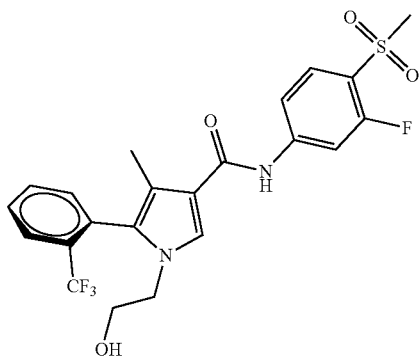

N-(3-Fluoro-4-(methylsulfonyl)phenyl)-1-(2-hydroxyethyl)-4-methyl-5-(2-(trifluoro methyl)phenyl)-1H-pyrrole-3-carboxamide (3.4 g, 7.02 mmol) was weighed and added into a 25 mL flask, and anhydrous acetonitrile (8 mL) was added to dissolve all the samples. High performance liquid chromatography (instrument: Waters SFC; column: Daicel AS-H 10 mm×250 mm 5 m; conditions: isocratic 20% MeOH+80% $CO_2$; flow rate: 8 mL/min; column temperature: 35° C.; back pressure: 100 bar; 10 μL samples per injection) was used for chiral resolution. The mixture was rotary evaporated under reduced pressure, and the solvent was removed to obtain the title compound as a white solid (1.43 g, 42.1%; HPLC retention time 8.627 min; purity 99.85%; ee value 99.80%).

MS (ESI, pos. ion) m/z: 485.1 (M+1);

$^1$H NMR (400 MHz, DMSO-$d_6$) δ (ppm): 10.15 (s, 1H), 7.98 (dd, J=13.5, 1.3 Hz, 1H), 7.90 (d, J=7.8 Hz, 1H), 7.82-7.76 (m, 3H), 7.75-7.68 (m, 2H), 7.47 (d, J=7.4 Hz, 1H), 4.94 (t, J=4.9 Hz, 1H), 3.73-3.64 (m, 1H), 3.56-3.45 (m, 3H), 3.28 (s, 3H), 1.92 (s, 3H).

Example 3 N-(3-Fluoro-4-(methylsulfonyl)phenyl)-1-((1-hydroxycyclopropyl)methyl)-4-methyl-5-(2-(trifluoromethyl)phenyl)-1H-pyrrole-3-carboxamide

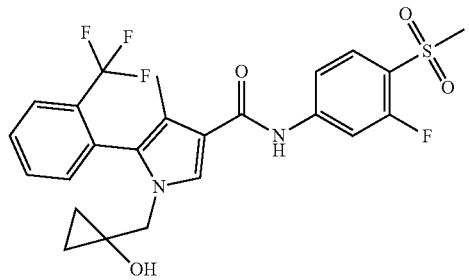 [SMILES: Cc1c(C(=O)Nc2ccc(S(C)(=O)=O)c(F)c2)cn(CC2(O)CC2)c1-c1ccccc1C(F)(F)F]

Step 1) Methyl 1-(benzyloxy)cyclopropanecarboxylate

Methyl 1-hydroxy-1-cyclopropanecarboxylate (1.02 g, 8.78 mmol) was weighed and added into a 100 mL flask, to the flask N,N-dimethylformamide (30 mL) was added. The mixture was cooled to 0° C., and sodium hydride (521.6 mg, 13.04 mmol, 60 mass %) was added. The reaction solution was stirred at 0° C. for 20 min and then benzyl bromide (1.1 mL, 9.3 mmol) was added. The mixture was reacted at room temperature for 3 h after addition. The reaction solution was extracted with ethyl acetate (80 mL×3), the organic phases were combined and washed with saturated brine (50 mL×2), dried over anhydrous sodium sulfate, then filtered and concentrated. The residue was separated by silica gel column chromatography (petroleum ether/ethyl acetate (v/v) =5/1) to obtain brown-yellow liquid (1.465 g, 80.9%).

MS (ESI, pos. ion) m/z: 207.2 (M+1).

Step 2) (1-(Benzyloxy)cyclopropyl)methanol

Tetrahydroaluminum lithium (233.1 mg, 6.14 mmol) was weighed and added into a 100 mL flask, tetrahydrofuran (15 mL) was added. A solution of methyl 1-(benzyloxy)cyclopropanecarboxylate (1.40 g, 6.79 mmol) in tetrahydrofuran (15 mL) was added dropwise. The mixture was stirred at room temperature for 3 h after addition. To the flask was added sodium sulfate decahydrate until the solution was clarified, the solution was suction filtered by diatomite, the filter cake was washed with ethyl acetate (20 mL×3) and the filtrate was concentrated. The residue was separate by silica gel column chromatography (petroleum ether/ethyl acetate (v/v)=5/1) to obtain yellow liquid (871.9 mg, 72.1%).

MS (ESI, pos. ion) m/z: 196.2 (M+$NH_4$).

Step 3) (1-(Benzyloxy)cyclopropyl)methyl methanesulfonate (1-(Benzyloxy)cyclopropyl)methanol (511 mg, 2.87 mmol) was weighed and added into a 50 mL flask, dichloromethane (15 mL) was added. The mixture was cooled to 0° C., triethylamine (0.80 mL, 5.8 mmol) was added, and methanesulfonyl chloride (0.29 mL, 3.7 mmol) was added dropwise. The mixture was reacted at room temperature for 2 h after addition. The reaction solution was extracted with dichloromethane (40 mL×3). The organic phase was dried with anhydrous sodium sulfate, then filtered and concentrated to obtain yellow liquid (730 mg, 99.34%).

MS (ESI, pos. ion) m/z: 279.0 (M+Na).

Step 4) Ethyl 1-((1-(benzyloxy)cyclopropyl)methyl)-4-methyl-5-(2-(trifluoromethyl)phenyl)-1H-pyrrole-3-carboxylate Ethyl 4-methyl-5-(2-(trifluoromethyl)phenyl)-1H-pyrrole-3-carboxylate (450 mg, 1.51 mmol) was weighed and added into a 50 mL flask, N,N-dimethylformamide (15 mL) and sodium hydride (186.3 mg, 4.66 mmol, 60 mass %) were added. The mixture was stirred at room temperature for 10 min, then a solution of (1-(benzyloxy)cyclopropyl)methyl methanesulfonate (730 mg, 2.85 mmol) in N,N-dimethylformamide (5 mL) was added dropwise. The mixture was stirred at room temperature overnight after addition. The reaction solution was extracted with ethyl acetate (80 mL×3), the organic phases were combined and washed with saturated brine (50 mL×2), dried with anhydrous sodium sulfate, then filtered and concentrated. The residue was separated by silica gel column chromatography (petroleum ether)/ethyl acetate (v/v)=10/1), light yellow oily liquid (617 mg, 89.10%) was obtained.

MS (ESI, pos. ion) m/z: 458.1 (M+1).

Step 5) 1-((1-(Benzyloxy)cyclopropyl)methyl)-4-methyl-5-(2-(trifluoromethyl)phenyl)-1H-pyrrole-3-carboxylic Acid Ethyl 1-((1-(benzyloxy)cyclopropyl)methyl)-4-methyl-5-(2-(trifluoromethyl)phenyl)-1H-pyrrole-3-carboxylate (617 mg, 1.35 mmol) was weighed and added into a 50 mL flask, to the flask were added ethanol (10 mL) and sodium hydroxide solution (2.0 mL, 12 mmol, 6 mol/L). The mixture was heated to 70° C. and stirred overnight after addition. The solvent was removed by rotary evaporation under reduced pressure, water (50 mL) was added to the residue, and the resulting mixture was washed with methyl tert-butyl ether (30 mL×2). The aqueous phase was adjusted to pH=2 with 1 M HCl solution and extracted with ethyl acetate (60 mL×4). The organic phase was dried with anhydrous sodium sulfate, then filtered and concentrated directly to obtain a pale yellow solid (523.1 mg, 90.33%).

MS (ESI, pos. ion) m/z: 430.3 (M+1).

Step 6) 1-((1-(Benzyloxy)cyclopropyl)methyl)-4-methyl-5-(2-(trifluoromethyl)phenyl)-1H-pyrrole-3-carbonyl Chloride 1-((1-(Benzyloxy)cyclopropyl)methyl)-4-methyl-5-(2-(trifluoromethyl)phenyl)-1H-pyrrole-3-formic acid (300 mg, 0.699 mmol) and dichloromethane (20 mL) were added into a flask, then oxalyl chloride (0.30 mL, 3.5 mmol) and N,N-dimethylformamide (5 mg, 0.0684 mmol) were added dropwise. The mixture was stirred at room temperature for 22 h. The solvent was evaporated under reduced pressure to obtain a yellow solid (312 mg, 99.70%).

Step 7) 1-((1-(Benzyloxy)cyclopropyl)methyl)-N-(3-fluoro-4-(methylsulfonyl)phenyl)-4-methyl-5-(2-(trifluoro (methyl)phenyl)-1H-pyrrole-3-carboxamide 3-Fluoro-4-methylsulfonylaniline (110 mg, 0.581 mmol), 1-((1-(benzyloxy)cyclopropyl)methyl)-4-methyl-5-(2-(trifluoromethyl)phenyl)-1H-pyrrole-3-carbonyl chloride (312 mg, 0.697 mmol) and pyridine (10 mL) were added into a sealed tube, the reaction system was heated to 100° C. and stirred for 29 h. The reaction solution was cooled to room temperature, 1 M HCl solution was added to adjust pH=3, the mixture was extracted with ethyl acetate (80 mL). The organic phase was adjusted to pH=8 with saturated sodium bicarbonate aqueous solution, then washed with saturated brine (60 mL), and dried with anhydrous sodium sulfate. The resulting mixture was filtered, the solvent was evaporated under reduced pressure, and the residue was separated by silica gel column chromatography (petroleum ether/ethyl acetate (v/v)=10/1-4/1) to obtain a pale yellow solid (140 mg, 40.10%).

MS (ESI, pos. ion) m/z: 601.0 (M+1).

Step 8) N-(3-Fluoro-4-(methylsulfonyl)phenyl)-1-((1-hydroxycyclopropyl)methyl)-4-methyl-5-(2-(trifluoromethyl)phenyl)-1H-pyrrole-3-carboxamide 1-((1-(Benzyloxy)cyclopropyl)methyl)-N-(3-fluoro-4-(methylsulfonyl)phenyl)-4-methyl-5-(2-(trifluoro (methyl)phenyl)-1H-pyrrole-3-carboxamide (140 mg, 0.233 mmol), methanol (10 mL) and palladium on carbon (30 mg, 10 mass %) were added into a flask, the reaction system was stirred at room temperature under $H_2$ for 3 h. The reaction solution was filtered, the filtrate was concentrated under reduced pressure The residue was separated by silica gel column chromatography (petroleum ether/ethyl acetate (v/v)=10/1-4/1), and then stirred with petroleum ether/ethyl acetate (10 mL/1 mL) for 1 h, then filtered and dried to obtain a white solid (80 mg, 67.23%).

MS (ESI, pos. ion) m/z: 511.1 (M+1).
$^1$H NMR (400 MHz, CDCl$_3$) δ (ppm): 8.00 (d, J=12.1 Hz, 1H), 7.94-7.79 (m, 3H), 7.72-7.56 (m, 3H), 7.41 (d, J=7.6 Hz, 1H), 3.73-3.69 (m, 2H), 3.24 (s, 3H), 2.11 (s, 3H), 0.92-0.87 (m, 2H), 0.54-0.48 (m, 1H), 0.44-0.40 (m, 1H).
$^{19}$F NMR (376 MHz, CDCl$_3$) δ (ppm): −60.95, −107.35.

Example 4

1-Cyclobutyl-N-(3-fluoro-4-(methylsulfonyl)phenyl)-4-methyl-5-(2-(trifluoromethyl)phenyl)-1H-pyrrole-3-formamide

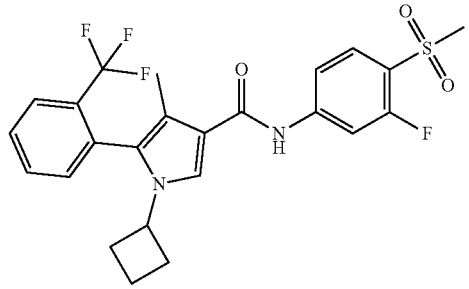 [SMILES: Cc1c(C(=O)Nc2ccc(S(C)(=O)=O)c(F)c2)cn(C2CCC2)c1-c1ccccc1C(F)(F)F]

Step 1) 4-Methyl-5-(2-(trifluoromethyl)phenyl)-1H-pyrrole-3-carboxylic Acid

Ethyl 4-methyl-5-(2-(trifluoromethyl)phenyl)-1H-pyrrole-3-carboxylate (30 g, 100.9 mmol) was weighed and added into a 1000 mL flask, then sodium hydroxide solution (60 mL, 1020 mmol, 17 mol/L) and ethanol (300 mL) were added. The mixture was heated to 70° C. and stirred for 12 h. The solvent was removed by rotary evaporation under reduced pressure. Water (1000 mL) was added to the residue and stirred at room temperature for 30 min. The resulting mixture was washed with methyl tert-butyl ether (100 mL×3), and the aqueous phase was adjusted to pH=2 with 6 M HCl solution. The resulting solution was extracted with ethyl acetate (200 mL×3). The organic phase was dried with anhydrous sodium sulfate, then filtered and concentrated directly to obtain a brown-yellow solid (27.1 g, 99.8%).

MS (ESI, pos. ion) m/z: 270.2 (M+1).

Step 2) Benzyl 4-methyl-5-(2-(trifluoromethyl)phenyl)-1H-pyrrole-3-carboxylate 4-Methyl-5-(2-(trifluoromethyl)phenyl)-1H-pyrrole-3-carboxylic acid (27.3 g, 101 mmol) was weighed and added into a 500 mL flask, then N,N-dimethylformamide (250 mL) was added. The mixture was cooled to 0° C., and cesium carbonate (33.09 g, 101.6 mmol) and benzyl bromide (12 mL, 101 mmol) were added. The mixture was reacted at 0° C. for 7 h after addition. Cesium carbonate (3.31 g, 10.16 mmol) and benzyl bromide (1.2 mL, 10.1 mmol) were added, the mixture was reacted overnight at 0° C. The reaction solution was extracted with ethyl acetate (200 mL×3), the organic phases were combined and washed with saturated brine (200 mL×3), dried with anhydrous sodium sulfate, then filtered and concentrated. The residue was separated by silica gel column chromatography (petroleum ether/ethyl acetate (v/v)=10/1) to obtain a brown-yellow solid (29.7 g, 81.5%).

MS (ESI, pos. ion) m/z: 360.1 (M+1).

Step 3) Benzyl 1-cyclobutyl-4-methyl-5-(2-(trifluoromethyl)phenyl)-1H-pyrrole-3-carboxylate Benzyl 4-methyl-5-(2-(trifluoromethyl)phenyl)-1H-pyrrole-3-carboxylate (1.0 g, 2.8 mmol) was weighed and added into a 100 mL flask, then N,N-dimethylformamide (25 mL) and sodium hydride (334.6 mg, 8.37 mmol, 60 mass %) were added. The mixture was stirred at room temperature for 10 min, and then bromocyclobutane (1.0 mL, 11 mmol) was added. After addition, the mixture was heated to 100° C. and stirred for 15 h. The reaction solution was cooled to room temperature and extracted with ethyl acetate (60 mL×3). The organic phases were combined and washed with saturated brine (50 mL×2), dried with anhydrous sodium sulfate, then filtered and concentrated. The residue was separated by silica gel column chromatography (petroleum ether/ethyl acetate (v/v)=10/1) to obtain pale yellow oily liquid (839 mg, 73%).

MS (ESI, pos. ion) m/z: 414.3 (M+1).

Step 4) 1-Cyclobutyl-4-methyl-5-(2-(trifluoromethyl)phenyl)-1H-pyrrole-3-carboxylic Acid Benzyl 1-cyclobutyl-4-methyl-5-(2-(trifluoromethyl)phenyl)-1H-pyrrole-3-carboxylate (830 mg, 2.01 mmol) was weighed and added into a 100 mL flask, then methanol (25 mL) and palladium on carbon (216.1 mg, 10 mass %) were added. The mixture was stirred at room temperature for 5 h under $H_2$. The reaction solution was suction filtered by diatomite, the filter cake was washed with methanol (10 mL×3). The filtrate was concentrated, and the residue was separated by silica gel column chromatography (petroleum ether/ethyl acetate (v/v)=2/1) to obtain a white solid (183.6 mg, 28.29%).

MS (ESI, pos. ion) m/z: 324.2 (M+1).

Step 5) 1-Cyclobutyl-4-methyl-5-(2-(trifluoromethyl)phenyl)-1H-pyrrole-3-carbonyl Chloride 1-Cyclobutyl-4-methyl-5-(2-(trifluoromethyl)phenyl)-1H-pyrrole-3-carboxylic acid (210 mg, 0.65 mmol) and dichloromethane (20 mL) were added a flask, oxalyl chloride (0.27 mL, 3.2 mmol) and N,N-dimethylformamide (5 mg, 0.0684 mmol) were added dropwise. The reaction system was stirred at room temperature for 21 h. The solvent was evaporated under reduced pressure to obtain a yellow solid (222 mg, 99.99%).

Step 6) 1-Cyclobutyl-N-(3-fluoro-4-(methylsulfonyl)phenyl)-4-methyl-5-(2-(trifluoromethyl)phenyl)-1H-pyrrole-3-formamide 3-Fluoro-4-methylsulfonylaniline (102 mg, 0.539 mmol), 1-cyclobutyl-4-methyl-5-(2-(trifluoromethyl)phenyl)-1H-pyrrole-3-carbonyl chloride (221 mg, 0.647 mmol) and pyridine (10 mL) were added into a sealed tube. The reaction system was heated to 90° C. and stirred for 24 h. The mixture was cooled to room temperature, 1 M HCl solution was added to adjust pH=3. The mixture was extracted with ethyl acetate (80 mL), the organic phase was adjusted pH=8 by saturated aqueous sodium bicarbonate solution. The resulting mixture was washed with saturated brine (60 mL), and dried with anhydrous sodium sulfate. The mixture was filtered and the solvent was evaporated under reduced pressure The residue was separated by silica gel column chromatography (petroleum ether/ethyl acetate (v/v)=10/1-4/1) to obtain a yellow solid (116 mg, 43.51%).

MS (ESI, pos. ion) m/z: 495.1 (M+1).

$^1$H NMR (400 MHz, CDCl$_3$) δ (ppm): 7.99 (d, J=12.4 Hz, 1H), 7.90 (s, 1H), 7.89-7.76 (m, 2H), 7.72-7.60 (m, 3H), 7.59 (s, 1H), 7.32-7.28 (m, 2H), 4.13-4.00 (m, 1H), 3.23 (s, 3H), 2.45-2.31 (m, 1H), 2.25-2.18 (m, 2H), 2.17-2.08 (m, 2H), 2.07 (s, 3H), 1.80-1.74 (m, 1H).

$^{19}$F NMR (376 MHz, CDCl$_3$) δ (ppm): −60.91, −107.38, −107.41, −107.43.

Example 5

N-(3-Fluoro-4-(methylsulfonyl)phenyl)-4-methyl-1-(oxetan-2-ylmethyl)-5-(2-(trifluoromethyl)phenyl)-1H-pyrrole-3-carboxamide

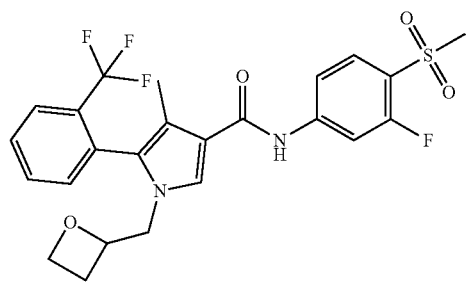 [SMILES: Cc1c(C(=O)Nc2ccc(S(C)(=O)=O)c(F)c2)cn(CC2CCO2)c1-c1ccccc1C(F)(F)F]

Step 1) Benzyl 4-methyl-1-(oxetan-2-ylmethyl)-5-(2-(trifluoromethyl)phenyl)-1H-pyrrole-3-carboxylate Benzyl 4-methyl-5-(2-(trifluoromethyl)phenyl)-1H-pyrrole-3-carboxylate (1.09 g, 3.03 mmol) and N,N-dimethylformamide (20 mL) were added into a flask, sodium hydride (133 mg, 3.33 mmol, 60 mass %) was added under ice bath. The mixture was stirred under $N_2$ for 0.5 h, 2-bromomethyloxetane (687 mg, 4.55 mmol) was added dropwise. The reaction system was stirred at room temperature for 24.5 h. To the flask was added saturated ammonium chloride solution (40 mL) to quench the reaction. The mixture was extracted with ethyl acetate (80 mL×2). The organic phases were combined, washed with saturated brine (40 mL×2) and dried with anhydrous sodium sulfate. The mixture was filtered and the solvent was evaporated under reduced pressure The residue was separated by silica gel column chromatography (dichloromethane/ethyl acetate (v/v)=100/1-50/1) to obtain a pale yellow solid (660 mg, 50.7%).

MS (ESI, pos. ion) m/z: 430.1 (M+1).

$^1$H NMR (400 MHz, CDCl$_3$) δ (ppm): 7.81 (d, J=7.5 Hz, 1H), 7.67-7.51 (m, 3H), 7.46 (d, J=7.5 Hz, 2H), 7.39 (t, J=7.4 Hz, 2H), 7.33 (t, J=7.2 Hz, 2H), 5.35-5.25 (m, 2H), 4.94-4.74 (m, 1H), 4.67-4.57 (m, 1H), 4.43 (ddt, J=34.0, 9.2, 5.9 Hz, 1H), 3.96-3.62 (m, 2H), 2.59 (qd, J=14.1, 7.0 Hz, 1H), 2.36-2.19 (m, 1H), 2.03 (d, J=4.6 Hz, 3H).

Step 2) 4-Methyl-1-(oxetan-2-ylmethyl)-5-(2-(trifluoromethyl)phenyl)-1H-pyrrole-3-carboxylic Acid Benzyl 4-Methyl-1-(oxetan-2-ylmethyl)-5-(2-(trifluoromethyl)phenyl)-1H-pyrrole-3-carboxylate (650 mg, 1.51 mmol), methanol (20 mL), and palladium-carbon (130 mg, 10 mass %) were added into a flask. The mixture was stirred at room temperature for 11 h under $H_2$ after addition. The reaction solution was filtered with diatomite, the filtrate was concentrated under reduced pressure, and the residue was separated by silica gel column chromatography (petroleum ether/ethyl acetate (v/v)=4/1-1/1) to obtain a pale yellow solid (480 mg, 93.46%).

MS (ESI, pos. ion) m/z: 340.2 (M+1).

$^1$H NMR (400 MHz, CDCl$_3$) δ (ppm): 7.81 (d, J=7.4 Hz, 1H), 7.70-7.54 (m, 3H), 7.37 (d, J=7.3 Hz, 1H), 4.97-4.79 (m, 1H), 4.70-4.57 (m, 1H), 4.45 (ddt, J=31.5, 9.2, 5.9 Hz, 1H), 3.88 (ddd, J=19.1, 14.7, 5.6 Hz, 1H), 3.76-3.64 (m, 1H), 2.69-2.55 (m, 1H), 2.40-2.20 (m, 1H), 2.06-2.00 (m, 3H).

Step 3) N-(3-Fluoro-4-(methylsulfonyl)phenyl)-4-methyl-1-(oxetan-2-ylmethyl)-5-(2-(trifluoromethyl)phenyl)-1H-pyrrole-3-carboxamide 4-Methyl-1-(oxetan-2-ylmethyl)-5-(2-(trifluoromethyl)phenyl)-1H-pyrrole-3-carboxylic acid (320 mg, 0.943 mmol), 3-fluoro-4-methylsulfonylaniline (178 mg, 0.941 mmol), pyridine (20 mL) and 1-(3-dimethylaminopropyl)-3-ethylcarbodiimide hydrochloride (365 mg, 1.89 mmol) were added into a flask. The reaction system was stirred at room temperature for 47 h. The solvent was evaporated under reduced pressure, ethyl acetate (60 mL) was added to dissolve, and then the mixture was washed with 1 M HCl solution (20 mL), saturated sodium bicarbonate aqueous solution (20 mL) and saturated brine (20 mL) respectively, dried with anhydrous sodium sulfate. The mixture was filtered, the solvent was evaporated under reduced pressure, and the residue was separated by silica gel column chromatography (dichloromethane/ethyl acetate (v/v)=50/1-20/1) to obtain a pale yellow solid (90 mg, 18.69%).

MS (ESI, pos. ion) m/z: 511.2 (M+1).

$^1$H NMR (400 MHz, CDCl$_3$) δ (ppm): 8.18-8.13 (m, 1H), 7.99-7.94 (m, 1H), 7.86-7.81 (m, 2H), 7.69-7.60 (m, 2H), 7.59-7.51 (m, 1H), 7.37-7.31 (m, 2H), 5.01-4.78 (m, 1H), 4.71-4.59 (m, 1H), 4.57-4.40 (m, 1H), 3.84-3.53 (m, 2H), 3.22 (s, 3H), 2.64-2.58 (m, 1H), 2.37-2.22 (m, 1H), 2.11-2.05 (m, 3H).

$^{19}$F NMR (376 MHz, CDCl$_3$) δ (ppm): −60.99, −61.07, −107.65, −107.68.

Example 6

N-(3-Fluoro-4-(methylsulfonyl)phenyl)-4-methyl-1-(oxetan-3-yl)-5-(2-(trifluoromethyl)phenyl)-1H-pyrrole-3-carboxamide

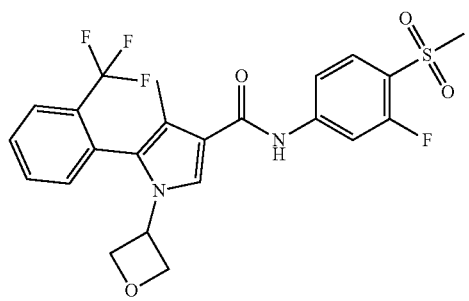 [SMILES: Cc1c(C(=O)Nc2ccc(S(C)(=O)=O)c(F)c2)cn(C2COC2)c1-c1ccccc1C(F)(F)F]

Step 1) Ethyl 4-methyl-1-(oxetan-3-yl)-5-(2-(trifluoromethyl)phenyl)-1H-pyrrole-3-carboxylate Ethyl 4-methyl-5-(2-(trifluoromethyl)phenyl)-1H-pyrrole-3-carboxylate (401 mg, 1.35 mmol) was weighed and added into a 50 mL flask, N,N-dimethylformamide and sodium hydride (168.9 mg, 4.22 mmol, 60 mass %) were added under ice bath conditions. After addition, the mixture was stirred at room temperature for 10 min. Then 3-iodooxetane (0.36 mL, 4.2 mmol) was added and the mixture was heated to 100° C. and stirred for 24 h. Sodium hydride (168.9 mg, 4.22 mmol, 60 mass %) and 3-iodooxetane (0.36 mL, 4.2 mmol) were added into the system, the mixture was heated and stirred at 100° C. for 24 h. The reaction solution was extracted with ethyl acetate (40 mL×3), the organic phases were combined and washed with saturated brine (50 mL×2), dried over anhydrous sodium sulfate, then filtered and concentrated. The residue was separated by silica gel column chromatography (petroleum Ether/ethyl acetate (v/v)=5/1) to obtain a pale yellow solid (365 mg, 76.59%).

MS (ESI, pos. ion) m/z: 354.3 (M+1).

Step 2) 4-Methyl-1-(oxetan-3-yl)-5-(2-(trifluoromethyl)phenyl)-1H-pyrrole-3-carboxylic Acid Ethyl 4-methyl-1-(oxetan-3-yl)-5-(2-(trifluoromethyl)phenyl)-1H-pyrrole-3-carboxylate (365 mg, 1.03 mmol) was weighed and added into a 50 mL flask, to the flask were added ethanol (10 mL) and sodium hydroxide solution (3.0 mL, 12 mmol, 4 mol/L). The mixture was heated to 70° C. and stirred overnight. The solvent was removed by rotary evaporation under reduced pressure, the residue was dissolved in water (60 mL), washed with methyl tert-butyl ether (20 mL×2), the aqueous phase was adjusted to pH=2 with 1 M HCl solution. The mixture was extracted with ethyl acetate (30 mL×4). The organic phase was dried with anhydrous sodium sulfate, then filtered and concentrated to obtain an orange solid (319.7 mg, 95.13%).

MS (ESI, pos. ion) m/z: 326.2 (M+1).

Step 3) 1-(1-chloro-3-hydroxypropan-2-yl)-4-methyl-5-(2-(trifluoromethyl)phenyl)-1H-pyrrole-3-carbonyl Chloride 4-Methyl-1-(oxetan-3-yl)-5-(2-(trifluoromethyl)phenyl)-1H-pyrrole-3-carboxylic acid (400 mg, 1.23 mmol) and dichloromethane (20 mL) and oxalyl chloride (0.52 mL, 6.1 mmol) were added to a flask, then N,N-dimethylformamide (9 mg, 0.123 mmol) were added dropwise. The reaction system was stirred at room temperature for 16 h. The solvent was evaporated under reduced pressure to obtain a yellow solid (467 mg, 99.89%).

Step 4) 1-(1-Chloro-3-hydroxypropan-2-yl)-N-(3-fluoro-4-(methylsulfonyl)phenyl)-4-methyl-5-(2-(trifluoromethyl)phenyl)-1H-pyrrole-3-carboxamide 3-Fluoro-4-methylsulfonylaniline (193 mg, 1.02 mmol), 1-(1-chloro-3-hydroxypropan-2-yl)-4-methyl-5-(2-(trifluoromethyl)phenyl)-1H-pyrrole-3-carbonyl chloride (465 mg, 1.286 mmol) and pyridine (10 mL) were added into a sealed tube. The reaction system was heated to 90° C. and stirred for 29 h. The mixture was cooled to room temperature, 1 M HCl solution was added to adjust pH=3. The mixture was extracted with ethyl acetate (80 mL), and saturated aqueous sodium bicarbonate solution was added to adjust pH=8. Then the mixture was washed with saturated brine (60 mL), and dried with anhydrous sodium sulfate. The resulting mixture was filtered, the solvent was evaporated under reduced pressure, and the residue was separated by silica gel column chromatography (petroleum ether/ethyl acetate (v/v)=10/1-4/1) to obtain a pale yellow solid (100 mg, 18.40%).

MS (ESI, pos. ion) m/z: 533.0 (M+1).

Step 5) N-(3-Fluoro-4-(methylsulfonyl)phenyl)-4-methyl-1-(oxetan-3-yl)-5-(2-(trifluoromethyl)phenyl)-1H-pyrrole-3-carboxamide 1-(1-Chloro-3-hydroxypropan-2-yl)-N-(3-fluoro-4-(methylsulfonyl)phenyl)-4-methyl-5-(2-((trifluoromethyl)phenyl)-1H-pyrrole-3-carboxamide (100 mg, 0.188 mmol), sodium hydroxide (22 mg, 0.55 mmol) and tetrahydrofuran (50 mL) were added into a flask, and the reaction system was heated to 70° C. and stirred for 4 h. The reaction solution was cooled to room temperature, adjusted to pH=7 by adding 1 M HCl solution. The resulting mixture was extracted with ethyl acetate (80 mL), the organic phase was washed with saturated brine (60 mL), and dried with anhydrous sodium sulfate. The mixture was filtered, the solvent was evaporated under reduced pressure, and the residue was separated by silica gel column chromatography (petroleum ether/ethyl acetate (v/v)=10/1-4/1) to obtain a pale yellow solid (40 mg, 42.93%).

MS (ESI, pos. ion) m/z: 497.1 (M+1).

$^1$H NMR (400 MHz, CDCl$_3$) δ (ppm): 8.25-7.77 (m, 5H), 7.66 (s, 2H), 7.28 (s, 2H), 4.90-4.72 (m, 5H), 3.25 (s, 3H), 2.09 (s, 3H).

$^{19}$F NMR (376 MHz, CDCl$_3$) δ (ppm): −61.26, −107.28.

Example 7

N-(3-Fluoro-4-(methylsulfonyl)phenyl)-4-methyl-1-(pyridin-3-yl)-5-(2-(trifluoromethyl)phen yl)-1H-pyrrole-3-carboxamide

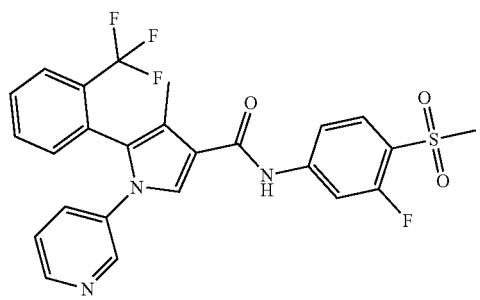 [SMILES: Cc1c(C(=O)Nc2ccc(S(C)(=O)=O)c(F)c2)cn(-c2cccnc2)c1-c1ccccc1C(F)(F)F]

Step 1) Benzyl 4-methyl-1-(pyridin-3-yl)-5-(2-(trifluoromethyl)phenyl)-1H-pyrrole-3-carboxylate Benzyl 4-methyl-5-(2-(trifluoromethyl)phenyl)-1H-pyrrole-3-carboxylate (1.00 g, 2.78 mmol), 3-fluoropyridine (1.35 g, 13.9 mmol), cesium carbonate (2.72 g, 8.35 mmol) and N,N-dimethylformamide (20 mL) were added into a sealed tube. The mixture was heated to 100° C. for 73 h under N$_2$. The mixture was cooled to room temperature, quenched with water (40 mL), extracted with ethyl acetate (80 mL), the organic phase was washed with saturated brine (40 mL×2), and dried with anhydrous sodium sulfate. The resulting mixture was filtered. The solvent was evaporated under reduced pressure to give a yellow solid (1.10 g, 90.6%).

Step 2) 4-Methyl-1-(pyridin-3-yl)-5-(2-(trifluoromethyl)phenyl)-1H-pyrrole-3-carboxylic Acid Benzyl 4-methyl-1-(pyridin-3-yl)-5-(2-(trifluoromethyl)phenyl)-1H-pyrrole-3-carboxylate (1.10 g, 2.52 mmol), methanol (20 mL) and palladium on carbon (110 mg, 10 mass %) were added into a flask, the mixture was stirred at room temperature for 17 h under H$_2$. The reaction solution was suction filtered with diatomite, the filtrate was concentrated under reduced pressure, and the residue was separated by silica gel column chromatography (petroleum ether/ethyl acetate (v/v)=4/1-1/1) to obtain a pale yellow solid (340 mg, 39.0%).

MS (ESI, pos. ion) m/z: 347.1 (M+1).

$^1$H NMR (400 MHz, CDCl$_3$) δ (ppm): 8.49 (d, J=4.1 Hz, 1H), 8.44 (s, 1H), 7.70 (d, J=7.7 Hz, 2H), 7.54 (dd, J=18.7, 7.4 Hz, 2H), 7.41 (dd, J=16.2, 7.8 Hz, 2H), 7.22 (dd, J=8.1, 4.8 Hz, 1H), 2.15 (s, 3H).

Step 3) 4-Methyl-1-(pyridin-3-yl)-5-(2-(trifluoromethyl)phenyl)-1H-pyrrole-3-carbonyl Chloride 4-Methyl-1-(pyridin-3-yl)-5-(2-(trifluoromethyl)phenyl)-1H-pyrrole-3-carboxylic acid (340 mg, 0.982 mmol) and dichloromethane (20 mL) were added into a flask, oxalyl chloride (0.42 mL, 5.0 mmol) and N,N-dimethylformamide (7 mg, 0.0958 mmol) were added dropwise. The mixture was stirred at room temperature for 14.5 h. The solvent was evaporated under reduced pressure to obtain a yellow solid (358 mg, 99.95%).

Step 4) N-(3-Fluoro-4-(methylsulfonyl)phenyl)-4-methyl-1-(pyridin-3-yl)-5-(2-(trifluoromethyl)phenyl)-1H-pyrrole-3-carboxamide 3-Fluoro-4-methylsulfonylaniline (131 mg, 0.692 mmol), 4-methyl-1-(pyridin-3-yl)-5-(2-(trifluoromethyl)phenyl)-1H-pyrrole-3-carbonyl chloride (358 mg, 0.981 mmol), pyridine (0.17 mL, 2.1 mmol) and tetrahydrofuran (20 mL) were added to a sealed tube. The mixture was heated to 90° C. and stirred for 49 h. The reaction solution was cooled to room temperature, 1 M HCl solution was added to adjust pH=3, the mixture was extracted with ethyl acetate (80 mL). Saturated sodium bicarbonate aqueous solution was added to the organic phase to adjust pH=8, then the organic phase was washed with saturated brine (60 mL), dried with anhydrous sodium sulfate. The resulting mixture was filtered, the solvent was evaporated under reduced pressure, and the residue was separated by silica gel column chromatography (petroleum ether/ethyl acetate (v/v)=2/1-1/1) to obtain a pale yellow solid (100 mg, 27.91%).

MS (ESI, pos. ion) m/z: 518.1 (M+1);
$^1$H NMR (400 MHz, CDCl$_3$) δ (ppm): 8.46 (d, J=17.9 Hz, 2H), 8.22 (s, 1H), 7.97 (d, J=12.2 Hz, 1H), 7.85 (t, J=8.1 Hz, 1H), 7.71 (d, J=7.3 Hz, 1H), 7.60 (s, 1H), 7.59-7.48 (m, 2H), 7.47-7.30 (m, 3H), 7.23 (d, J=4.7 Hz, 1H), 3.23 (s, 3H), 2.18 (s, 3H).
$^{19}$F NMR (376 MHz, CDCl$_3$) δ (ppm): −60.42, −107.35.

Example 8

N-(4-Fluoro-3-methyl-2-oxo-2,3-dihydrobenzo[d]thiazol-6-yl)-1-(2-hydroxyethyl)-4-methyl-5-(2-(trifluoromethyl)phenyl)-1H-pyrrole-3-carboxamide

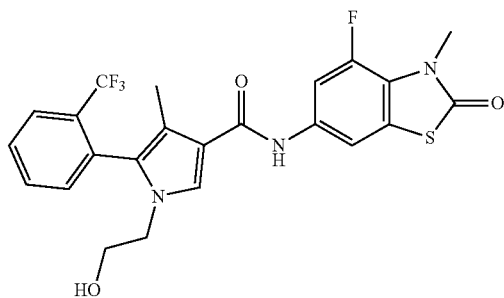 [SMILES: Cc1c(C(=O)Nc2cc(F)c3c(c2)sc(=O)n3C)cn(CCO)c1-c1ccccc1C(F)(F)F]

Step 1) 4-fluoro-6-nitrobenzo[d]thiazole-2(3H)-one

At −10° C., 2(3H)-4-fluorobenzothiazolone (5.00 g, 29.6 mmol) and concentrated H$_2$SO$_4$ (50 mL) were added into a flask, concentrated HNO$_3$ (2.03 mL, 29.5 mmol) was slowly added dropwise. The mixture was stirred at −10° C. for 1 h. The reaction solution was poured into ice water, stirred for 1 h, and filtered with suction. The filter cake was washed with ice water (20 mL×2). The filter cake was collected and dried under vacuum at 60° C. for 12 h to obtain a pale yellow solid (5.40 g, 85.3%).

MS (ESI, pos. ion) m/z: 215.0 (M+1).

Step 2) 4-fluoro-3-methyl-6-nitrobenzo[d]thiazole-2(3H)-one

4-Fluoro-6-nitrobenzo[d]thiazole-2(3H)-one (1.00 g, 4.67 mmol), DBU (0.84 mL, 5.6 mmol) and N,N-dimethylformamide (20 mL, 375.2 mmol) were added into a flask, methyl iodide (0.35 mL, 5.6 mmol) was slowly added dropwise. The mixture was heated to 65° C. and stirred for 16.5 h. The reaction solution was extracted with ethyl acetate (50 mL×3), and the organic phases were combined and washed with 1 M HCl solution (50 mL) and saturated brine (50 mL), and then dried with anhydrous sodium sulfate. The mixture was filtered, the solvent was evaporated under reduced pressure, and the residue was separated by silica gel column chromatography (petroleum ether/ethyl acetate (v/v)=10/1-4/1) to obtain a yellow solid (1.07 g, 100%).

MS (ESI, pos. ion) m/z: 229.1 (M+1).

Step 3) 6-Amino-4-fluoro-3-methylbenzo[d]thiazole-2(3H)-one

4-Fluoro-3-methyl-6-nitrobenzo[d]thiazole-2(3H)-one (1.07 g, 4.69 mmol), tetrahydrofuran (50 mL), methanol (50 mL) and palladium on carbon (107 mg, 10 mass %) were added into a flask. The mixture was reacted at room temperature for 9 h under H$_2$. Palladium on carbon (107 mg, 10 mass %) was added to the system, and the mixture was reacted at room temperature for 12 h under H$_2$. The reaction solution was suction filtered with diatomite, and the filtrate was concentrated under reduced pressure. The crude product was stirred with ethyl acetate/methanol (10 mL/2 mL) to obtain a yellow solid (400 mg, 43.0%).

MS (ESI, pos. ion) m/z: 199.1 (M+1).
$^1$H NMR (400 MHz, CDCl$_3$) δ (ppm): 6.53 (s, 1H), 6.41 (d, J=13.7 Hz, 1H), 3.71 (s, 2H), 3.61 (d, J=3.2 Hz, 3H).

Step 4) 1-(2-(Benzyloxy)ethyl)-N-(4-fluoro-3-methyl-2-oxo-2,3-dihydrobenzo[d]thiazol-6-yl)-4-methyl-5-(2-(trifluoromethyl)phenyl)-1H-pyrrole-3-carboxamide 1-(2-(Benzyloxy)ethyl)-4-methyl-5-(2-(trifluoromethyl)phenyl)-1H-pyrrole-3-carbonyl chloride (312 mg, 0.740 mmol), 6-amino-4-fluoro-3-methylbenzo[d]thiazole-2(3H)-one (122 mg, 0.615 mmol) and pyridine (10 mL) were added into a sealed tube, the reaction system was heated to 90° C. and reacted for 30 h. The reaction solution was cooled to room temperature, and saturated sodium bicarbonate aqueous solution was added to adjust the pH=8. The mixture was extracted with dichloromethane (40 mL×2), and the organic phases were combined and washed with saturated brine (20 mL), and dried over anhydrous sodium sulfate. The resulting mixture was filtered, the solvent was evaporated under reduced pressure, and the residue was separated by silica gel column chromatography (petroleum ether/ethyl acetate (v/v)=10/1-5/1) to obtain a pale yellow solid (300 mg, 83.52%).

MS (ESI, pos. ion) m/z: 584.2 (M+1).

Step 5) N-(4-Fluoro-3-methyl-2-oxo-2,3-dihydrobenzo[d]thiazol-6-yl)-1-(2-hydroxyethyl)-4-methyl-5-(2-(trifluoromethyl)phenyl)-1H-pyrrole-3-carboxamide 1-(2-(Benzyloxy)ethyl)-N-(4-fluoro-3-methyl-2-oxo-2,3-dihydrobenzo[d]thiazol-6-yl)-4-methyl-5-(2-(trifluoromethyl)phenyl)-1H-pyrrole-3-carboxamide (300 mg, 0.514 mmol), methanol (20 mL) and palladium on carbon (60 mg, 10 mass %) were added to a reaction flask. The mixture was reacted at room temperature for 22 h under H$_2$. Palladium on carbon (60 mg, 10 mass %) was added, the reaction solution was heated to 50° C. and stirred for 24 h. The reaction solution was suction filtered with diatomite, the filtrate was concentrated under reduced pressure. The residue was separated by silica gel column chromatography (petroleum ether/ethyl acetate (v/v)=4/1-1/2), then stirred with petroleum ether/ethyl acetate (20 mL/2 mL) for 1 h. The resulting mixture was filtered with suction, and the filter cake was collected and dried at 50° C. to obtain a white solid (100 mg, 39.42%).

MS (ESI, pos. ion) m/z: 494.1 (M+1).

$^1$H NMR (400 MHz, CDCl$_3$) δ (ppm): 7.84 (d, J=7.5 Hz, 1H), 7.70-7.60 (m, 2H), 7.58 (d, J=15.8 Hz, 2H), 7.47 (s, 1H), 7.403-7.38 (m, 2H), 3.85-3.67 (m, 4H), 3.67 (d, J=2.9 Hz, 3H), 2.09 (s, 3H).

$^{19}$F NMR (376 MHz, CDCl$_3$) δ (ppm): −60.97, −131.08.

Example A In Vitro Activity Test

Experimental Principle:

Using the characteristics of luciferase binding to the substrate to generate a chemiluminescence reaction, the plasmid containing mineralocorticoid receptor (MR) ligand binding domain (LBD) fused with Gal4 DNA binding domain (DBD) and the firefly luciferase reporter gene plasmid under the control of Gal4 UAS (upstream activation sequence) are transfected into human embryonic kidney cells (HEK293). The changes in mineralocorticoid receptor activity before and after stimulation or the influence of different stimuli on mineralocorticoid receptor activity are judged by the level of firefly luciferase activity. At the same time, in order to reduce the impact of internal change factors on the accuracy of the experiment, the plasmid with *Renilla* luciferase gene is used as a control plasmid to transfect cells to provide an internal control for transcriptional activity, so that the test results are not interfered by changes in experimental conditions.

Test Method

1) The HEK293 cells were collected after trypsinization and the cell density was adjusted to 500,000 cells/mL;

2) FuGENE HD transfection reagent was added to the cell suspension;

3) The above cell suspension was inoculated into a 96-well cell culture plate of 100 μL/well, and incubated for 24 hours at 37° C., 5% CO$_2$;

4) A series of concentrations of the test compound solution and EC$_{80}$ concentration of agonist aldosterone were added to each well and incubated for 18 hours;

5) Firefly and *Renilla* luciferase signals were detected by Promega dual luciferase reporter gene test system.

Result Processing:

1) After obtaining the firefly luciferase signal (F) and the *Renilla* luciferase signal (R), the *Renilla* luciferase signal was used for correction, that is, the F/R value was used for subsequent calculation of inhibition rate;

2) % inhibition rate=(Max−X)/(Max−Min)×100%, wherein Max is the F/R value of the positive control well, Min is the F/R value of the negative control well, and X is the test compound well of different concentrations F/R value;

3) IC$_{50}$ was calculated by GraphPrism 5.0 mapping software.

Results

TABLE 3

In vitro activity data of the compounds of the present invention

| Example No. | MR IC$_{50}$ (nM) |
| --- | --- |
| Example 1 | 6.93 |
| Example 2 | 3.4 |
| Example 3 | 47.6 |
| Example 5 | 21.5 |
| Example 6 | 30.3 |
| Example 7 | 84.5 |
| Example 8 | 82.2 |

Experimental conclusion: It can be seen from the experimental results in Table 3 that the compounds of the examples of the present invention have good mineralocorticoid receptor (MR) antagonistic activity, and they can be used as effective mineralocorticoid receptor antagonists.

Example B the Pharmacokinetics Test of the Compounds of the Present Invention

Preparation of the test compound solution: The test compound was formulated into a solution with 5% dimethyl sulfoxide, 60% PEG400 and 35% normal saline for oral or intravenous administration.

Example B1 Pharmacokinetic Experiment of the Compound of the Present Invention in Beagle Dogs Beagle dogs 8-10 kg were randomly divided into two groups, and the test compound was administered orally at a dosage of 5.0 mg/kg; after administration, blood was collected at the time points of 0.0833, 0.25, 0.5, 1.0, 2.0, 4.0, 6.0, 8.0, 24.0, 32.0 and 48.0 hours. A standard curve was established within a suitable range according to the sample concentration, and AB SCIEX API4000 LC-MS/MS was used to determine the concentration of the test compounds in the plasma sample in the MRM mode. According to the drug concentration-time curve, the WinNonLin 6.3 software non-compartmental model method was used to calculate the pharmacokinetic parameters.

Results

TABLE 4

Pharmacokinetic data of the compounds of the present invention in Beagle dogs

| Test compounds | T$_{max}$ (h) | C$_{max}$ (ng/mL) | AUC$_{INF}$ (h*ng/mL) | T$_{1/2}$ (h) |
| --- | --- | --- | --- | --- |
| CS-3150 | 2.33 | 1580 | 45600 | 20.3 |
| Example 2 | 3.33 | 4690 | 145000 | 25.3 |

Experimental conclusion: It can be seen from the data in Table 4 that the compounds of the present invention have better in vivo pharmacokinetic properties. For example, compared with the control compound CS-3150, the compound of Example 2 shows higher exposure, blood concentration and long half-life in beagle dogs.

Example B2 Pharmacokinetic Experiment of the Compounds of the Present Invention in Cynomolgus Monkey Three female cynomolgus monkeys of 3.0-3.5 kg were taken and orally administered with the test compound at a dosage of 3 mg/kg; after the administration, blood was collected at the time points of 0.083, 0.25, 0.5, 1, 2, 4, 6, 8, 24, 32 and 48 hours. A standard curve was established within an appropriate range based on the sample concentration, and AB SCIEX API 5000 LC-MS/MS was used to determine the concentration of the test compounds in the plasma sample in the MRM mode. According to the drug concentration-time curve, WinNnonlin 6.3 software non-compartmental model method was used to calculate the pharmacokinetic parameters.

Results

TABLE 5

Pharmacokinetic data of the compounds of the present invention in cynomolgus monkeys

| Test compounds | $T_{max}$ (h) | $C_{max}$ (ng/ml) | $AUC_{INF}$ (h*ng/ml) | $T_{1/2}$ (h) |
|---|---|---|---|---|
| CS-3150 | 1.67 | 741 | 8990 | 9.63 |
| Example 2 | 5.3 | 1040 | 22000 | 13 |

Conclusion: The compounds of the present invention have good pharmacokinetic properties in cynomolgus monkeys. Specifically, compared to the control compound CS-3150, the compound of Example 2 has more excellent pharmacokinetic properties, such as higher exposure, blood concentration and bioavailability.

Example C In Vitro Phototoxicity Test of the Compounds of the Present Invention Preparation of the test compound solution: The test compound was dissolved in dimethyl sulfoxide to obtain a 10 mg/mL solution, and then diluted with dimethyl sulfoxide in multiples of 2.15 times into solutions of different concentrations.

Balb/c 3T3 cells were seeded on 96-well culture plates. After 24 hours of culture, the culture medium was discarded, different concentrations of test compounds or balanced salts (HBSS) solution containing positive control substance (chlorpromazine hydrochloride, CPZ) and vehicle control substance were added. Two culture plates of each concentration of the test compound and the positive control substance are a light (+UV) plate and a non-light (-UV) plate, respectively. After incubating for 1 hour, the light plate was placed under UVA with a light intensity of about 1.7 mw/cm2 until the light dose reached 5.0 J/cm2. The non-light plate was placed at room temperature and protected from light for the same time. After the light was over, the culture medium was replaced with fresh one and continuously cultured for 18-22 hours. About 3 hours before the culture was complete, the culture medium was replaced with a medium containing neutral red and serum-free. After incubation, neutral red eluent was added, the absorbance value (OD540) of each well at 540 nm was measured after shaking. The cell 50% inhibitory concentration (IC50), light stimulating factor (PIF) and/or average light effect (MPE) were calculated. The phototoxicity of the compound was determined according to the following criteria: PIF>5 is judged as positive for phototoxicity; 5>PIF>2 is judged as possible phototoxicity; 2>PIF is judged as no phototoxicity.

TABLE 6

Test results of in vitro 3T3 cell neutral red uptake phototoxicity of the compounds of the present invention

| Test sample/ Control | $IC_{50}$ (µg/mL) | | PIF | MPE | Photo-toxicity |
|---|---|---|---|---|---|
| | $IC_{50\ (-UV)}$ | $IC_{50\ (+UV)}$ | | | |
| Example 2 | 63.815 | 49.565 | 1.289 | −0.044 | − |
| CPZ | 36.695 | 0.982 | 37.381 | 0.368 | + |

Conclusion: The results of the in vitro phototoxicity test of the compound of Example 2 are shown in Table 6. It can be seen from the test results that the compound of Example 2 of the present invention has no in vitro phototoxicity. That is, the compound of Example 2 has low toxicity, high safety and better druggability.

Reference throughout this specification to "an embodiment," "some embodiments," "one embodiment", "another example," "an example," "a specific examples," or "some examples," means that a particular feature, structure, material, or characteristic described in connection with the embodiment or example is included in at least one embodiment or example of the present disclosure. Thus, the appearances of the above terms throughout this specification are not necessarily referring to the same embodiment or example of the present disclosure. Furthermore, the particular features, structures, materials, or characteristics may be combined in any suitable manner in one or more embodiments or examples. In addition, those skilled in the art can integrate and combine different embodiments, examples or the features of them as long as they are not contradictory to one another.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A compound having Formula (I) or a stereoisomer, a geometric isomer, a tautomer, an atropisomer, an N-oxide, a hydrate, a solvate, an ester, a pharmaceutically acceptable salt or a prodrug thereof,

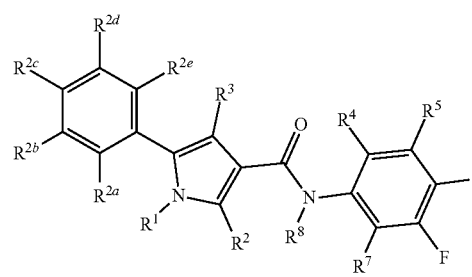

(I)

wherein, $R^1$ is ethyl, wherein, the ethyl is substituted with $R^a$;
$R^a$ is OH;
each of $R^{2a}$, $R^{2b}$, $R^{2c}$, and $R^{2d}$ is independently H or D;
$R^{2e}$ is trifluoromethyl;
$R^2$ is H or D;
$R^3$ is methyl, ethyl, n-propyl or isopropyl;
each of $R^4$, $R^5$ and $R^7$ is independently H and D;
$R^6$ is —S(═O)$_2$CH$_3$; and
$R^8$ is H or D.

2. The compound according to claim 1 having Formula (Ia) or a stereoisomer, a geometric isomer, a tautomer, an atropisomer, an N-oxide, a hydrate, a solvate, an ester, a pharmaceutically acceptable salt or a prodrug thereof,

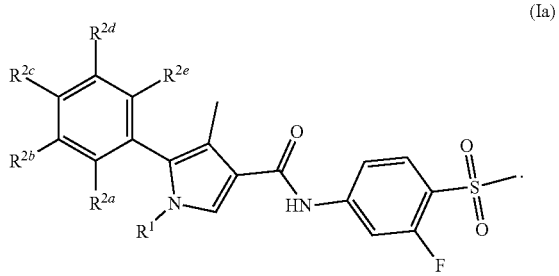

(Ia)

3. The compound according to claim 1 having Formula (IIa) or a stereoisomer, a geometric isomer, a tautomer, an atropisomer, an N-oxide, a hydrate, a solvate, an ester, a pharmaceutically acceptable salt or a prodrug thereof,

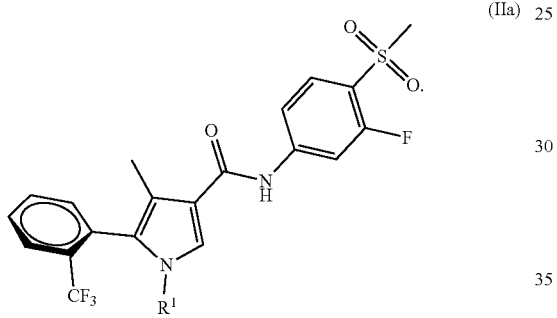

(IIa)

4. The compound according to claim 1 having the following structures, or a stereoisomer, a geometric isomer, a tautomer, an atropisomer, an N-oxide, a hydrate, a solvate, an ester, a pharmaceutically acceptable salt or a prodrug thereof,

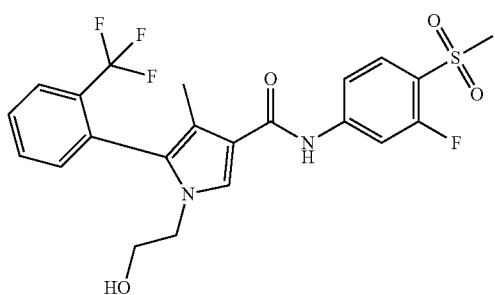

(1)

5. A pharmaceutical composition comprising the compound of claim 1; optionally, the pharmaceutical composition further comprises at least one of a pharmaceutically acceptable carrier, excipient, diluent, adjuvant and vehicle.

6. The pharmaceutical composition according to claim 5, further comprising one or more other active ingredients, wherein the other active ingredient is an ACE inhibitor, a renin inhibitor, an angiotensin II receptor antagonist, a β-receptor blocker, acetylsalicylic acid, a diuretic, a calcium antagonist, a statin, a digitalis derivative, a calcium sensitizer, a nitrate or an antithrombotic agent.

7. The compound according to claim 1 having the following structure, or a stereoisomer, a geometric isomer, a tautomer, an atropisomer, an N-oxide, a hydrate, a solvate, an ester, a pharmaceutically acceptable salt or a prodrug thereof,

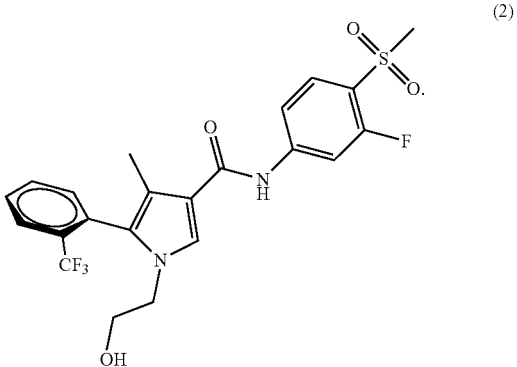

(2)

8. A method for treating or alleviating a disease selected from the group consisting of hyperaldosteronism, hypertension, chronic heart failure, sequelae of myocardial infarction, liver cirrhosis, non-alcoholic steatohepatitis, chronic kidney disease, diabetic nephropathy, renal failure, fibrosis and stroke in a patient, the method comprising administering to the subject a therapeutically effective amount of the compound according to claim 1.

9. A method for treating or alleviating a disease selected from the group consisting of hyperaldosteronism, hypertension, chronic heart failure, sequelae of myocardial infarction, liver cirrhosis, non-alcoholic steatohepatitis, chronic kidney disease, diabetic nephropathy, renal failure, fibrosis and stroke in a patient, the method comprising administering to the subject a therapeutically effective amount of the pharmaceutical composition according to claim 5.

* * * * *